(12) United States Patent
Higashino

(10) Patent No.: US 8,542,562 B2
(45) Date of Patent: Sep. 24, 2013

(54) OPTICAL DISC DRIVE AND RECORDING METHOD

(75) Inventor: Hiroyuki Higashino, Kawasaki (JP)

(73) Assignee: Toshiba Samsung Storage Technology Corporation, Kawasaki (JP)

( * ) Notice: Subject to any disclaimer, the term of this patent is extended or adjusted under 35 U.S.C. 154(b) by 990 days.

(21) Appl. No.: 11/624,421

(22) Filed: Jan. 18, 2007

(65) Prior Publication Data

US 2007/0171787 A1     Jul. 26, 2007

(30) Foreign Application Priority Data

Jan. 24, 2006   (JP) ................... 2006-015061

(51) Int. Cl.
 *G11B 5/09* (2006.01)
 *G11B 11/00* (2006.01)
(52) U.S. Cl.
 USPC ...................... 369/47.5; 369/13.26
(58) Field of Classification Search
 None
 See application file for complete search history.

(56) References Cited

U.S. PATENT DOCUMENTS

| | | | |
|---|---|---|---|
| 5,457,674 A * | 10/1995 | Watanabe et al. ............ | 369/53.3 |
| 2002/0159352 A1 * | 10/2002 | Yamada ..................... | 369/53.15 |
| 2003/0043714 A1 * | 3/2003 | Takeda ...................... | 369/47.53 |
| 2005/0094518 A1 * | 5/2005 | Ueki ......................... | 369/47.53 |
| 2005/0099925 A1 | 5/2005 | Nakajo | |
| 2006/0044974 A1 * | 3/2006 | Nakamura et al. ........... | 369/53.1 |

FOREIGN PATENT DOCUMENTS

| | | |
|---|---|---|
| JP | 2001-283439 | 10/2001 |
| JP | 2004-265499 | 9/2004 |
| JP | 2004-355727 | 12/2004 |

* cited by examiner

*Primary Examiner* — Joseph Feild
*Assistant Examiner* — Carl Adams
(74) *Attorney, Agent, or Firm* — Oblon, Spivak, McClelland, Maier & Neustadt, L.L.P.

(57) ABSTRACT

An optical disc drive includes a memory stored a write strategy, a converting unit which converts a recording data into a recording pulse based on the write strategy stored in the memory, an inspection unit which inspects a state of the recording data from a reproducing signal, a recording controller which executes a recording operation to record the recording data by applying a laser beam corresponding to the recording pulse to an optical disc, suspends the recording operation, judges whether correction of the write strategy according to an inspection result of the inspection unit is necessary, and restarts the recording operation after the write strategy saved in the memory is collected, and a correction unit which corrects the write strategy saved in the memory when the correction of the write strategy according to an inspection result of the inspection unit is necessary.

8 Claims, 16 Drawing Sheets

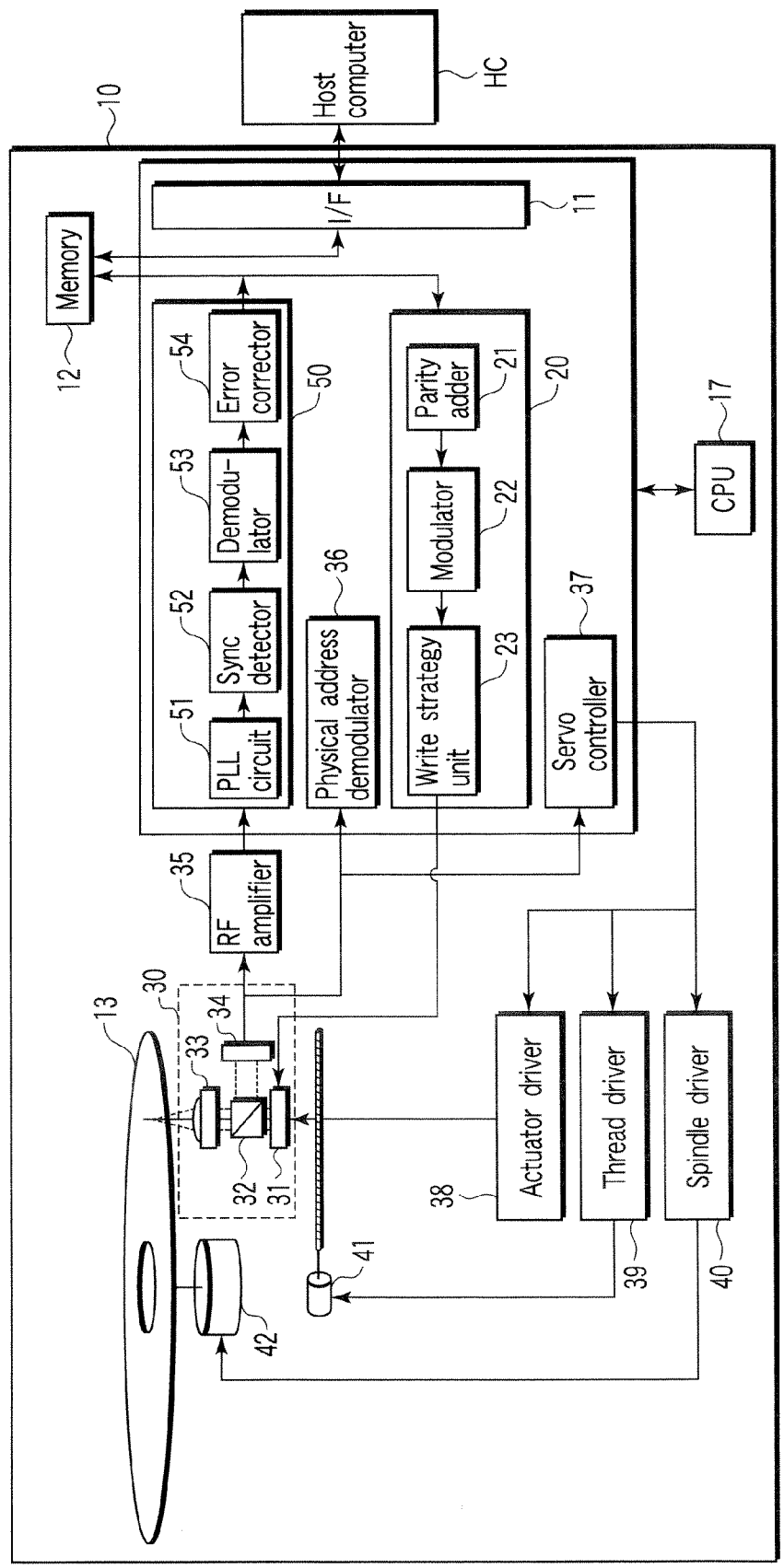
F I G. 1

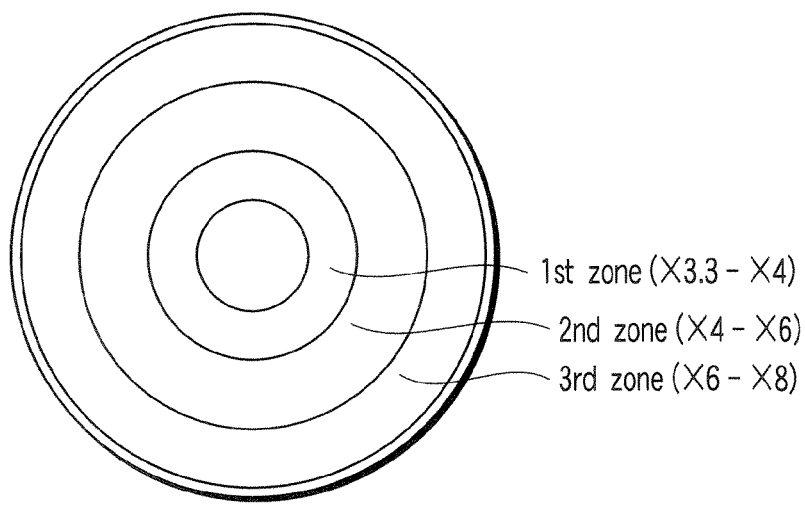
F I G. 3A
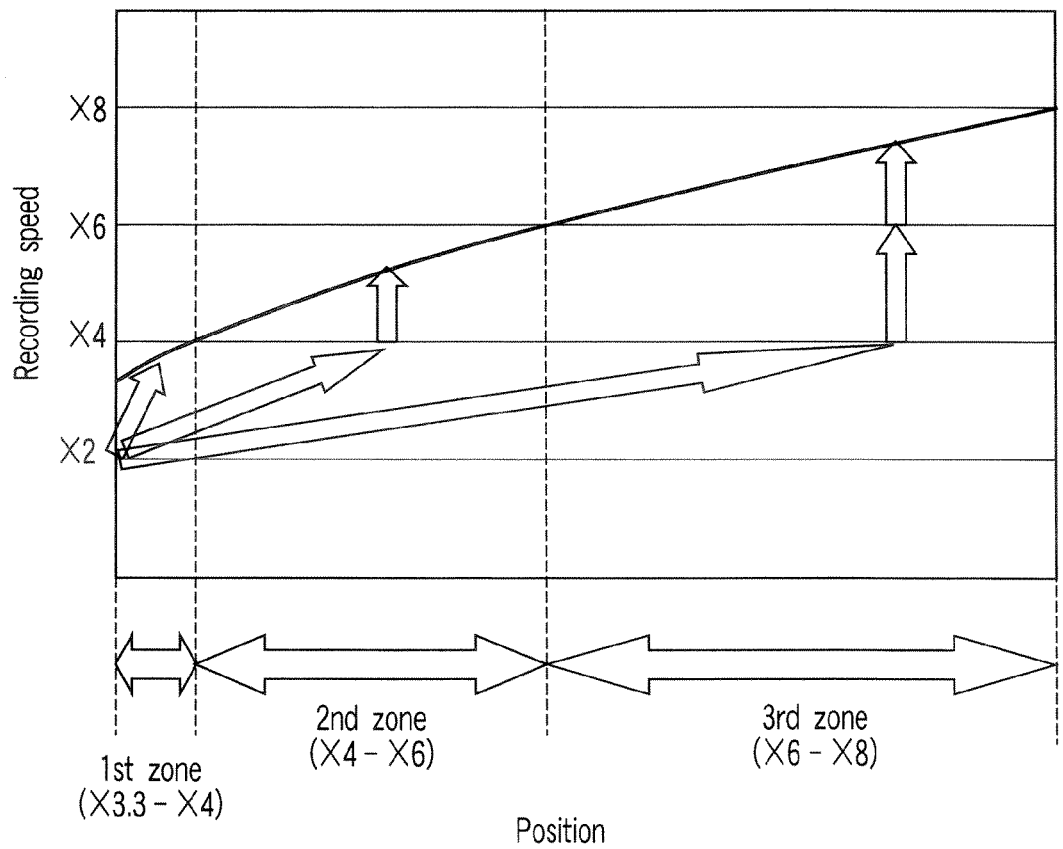
F I G. 3B

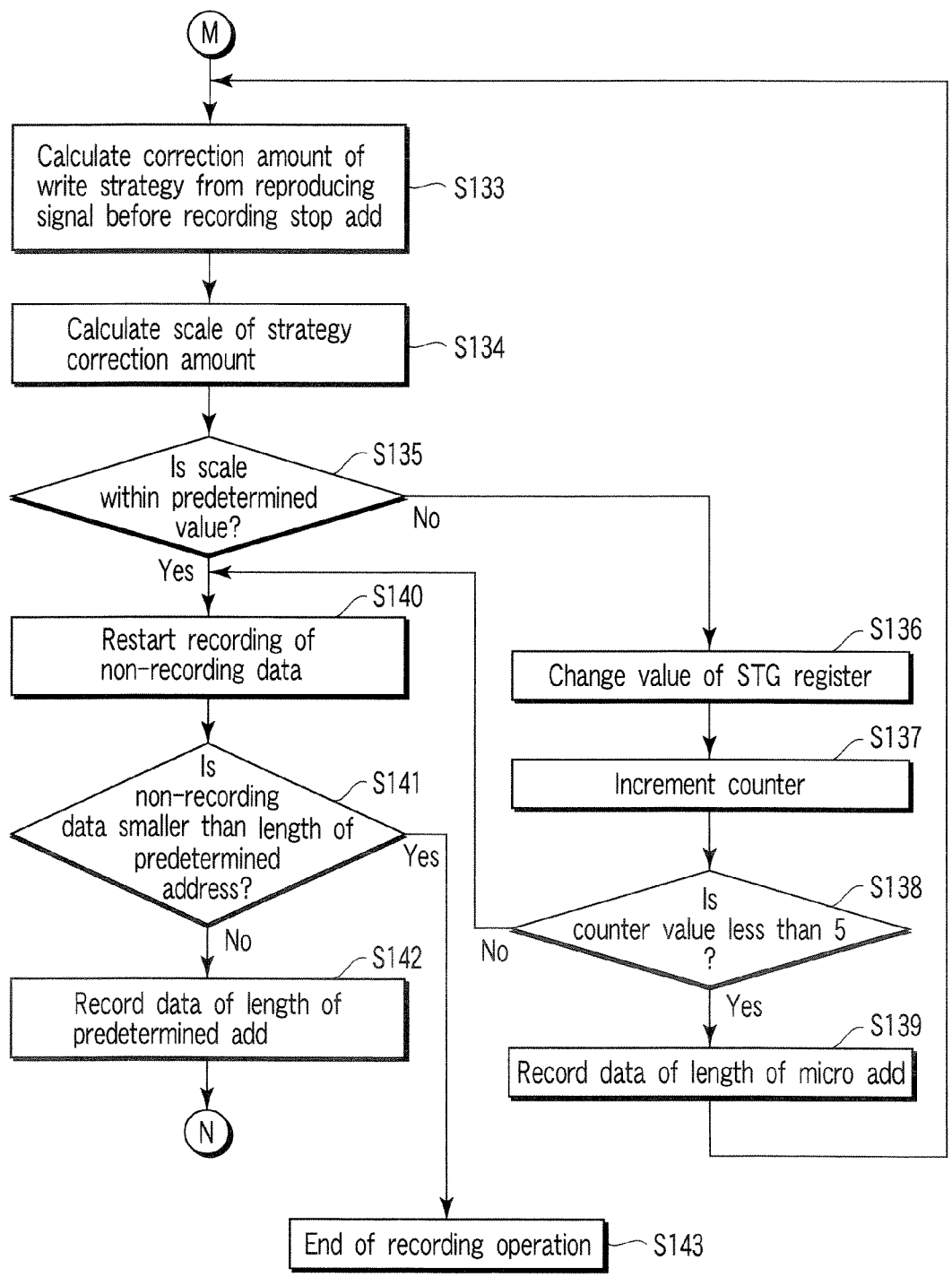
F I G. 15

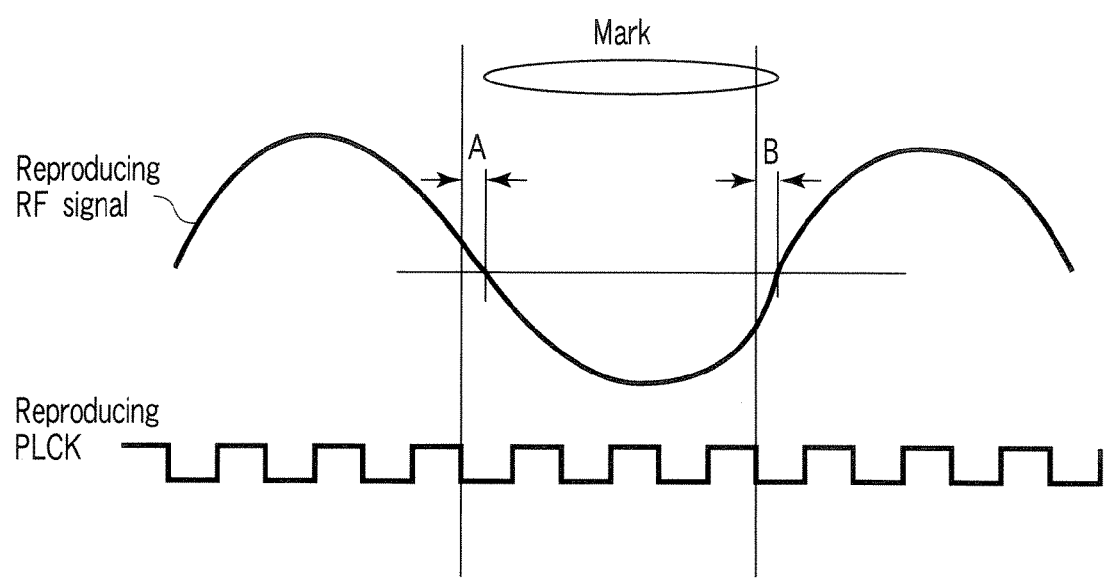
F I G. 16

OPTICAL DISC DRIVE AND RECORDING METHOD

CROSS-REFERENCE TO RELATED APPLICATIONS

This application is based upon and claims the benefit of priority from prior Japanese Patent Application No. 2006-015061, filed Jan. 24, 2006, the entire contents of which are incorporated herein by reference.

BACKGROUND OF THE INVENTION

1. Field of the Invention

The present invention relates to an optical disc drive and a recording method, which are capable of changing recording conditions to obtain high recording quality.

2. Description of the Related Art

In the conventional system which sets recording conditions based on the information stored in media, high recording quality is not necessarily obtained because of the different recording characteristics caused by the difference in hardware such as an optical head.

Even in a system which designs recording conditions suitable for a recording medium having a unique ID, when designing a drive, high recording quality is not necessarily obtained in all drives in mass production because of the difference in the characteristics of each drive.

It is thus difficult to control variations in the recording quality. In addition, there is another problem of ensuring a memory area to store recording conditions for each medium.

Jpn. Pat. Appln. KOKAI Publication No. 2004-355727 discloses the technique which executes test recording in a certain write strategy and corrects the write strategy according to a reproducing signal in the test recording, in order to obtain high recording quality.

The paragraph 0089 of the above document states "PCA (Power Calibration Area) may be used for optical discs, such as CD-R and DVD-R, for example, and a part or all of data recording area may be used for an optical disc based on the Z-CLV recording system".

However, in the method of the above Application, in order to detect the difference in various set parameters in each strategy, it is necessary to make test recording of any one of the following patterns for detecting the difference in various set parameters of each strategy, by using different two kinds of strategies.

Reproducing pattern consisting of fixed length pit, fixed length land, and variable length pit Reproducing pattern consisting of variable length pit, fixed length land, and fixed length pit Reproducing pattern consisting of variable length land, fixed length land, and fixed length land Reproducing pattern consisting of fixed length land, fixed length pit, and variable length land However, in discs of CD-R and DVD-R standards, test recording area exists only in the innermost or outermost periphery of a disc, and test recording is impossible in a user data area occupying most area of the inner to outer tracks, and correction of strategy is difficult.

Further, even if test recording pattern is not the above specific pattern but a user data pattern, a recording quality may become not to be reproduced if a strategy is not optimized before recording. Thus, test recording in a user data area is difficult in CD-R and DVD-R discs.

BRIEF SUMMARY OF THE INVENTION

According to one aspect of the present invention, there is provided an optical disc drive comprising: a memory stored a write strategy; a converting unit which converts a recording data into a recording pulse based on the write strategy stored in the memory; an inspection unit which inspects a state of the recording data from a reproducing signal; a recording controller which executes a recording operation to record the recording data by applying a laser beam corresponding to the recording pulse to an optical disc, suspends the recording operation, judges whether correction of the write strategy according to an inspection result of the inspection unit is necessary, and restarts the recording operation after the write strategy saved in the memory is collected; and a correction unit which corrects the write strategy saved in the memory when the correction of the write strategy according to an inspection result of the inspection unit is necessary.

BRIEF DESCRIPTION OF THE SEVERAL VIEWS OF THE DRAWING

FIG. 1 is a block diagram showing a system configuration of an optical disc drive according to an embodiment of the invention;

FIGS. 3A and 3B are diagrams showing a recording speed corresponding to an address of an optical disc;

FIG. 15 is a flowchart showing a procedure of recording operation according to an embodiment of the invention; and FIG. 16 is a diagram used for explaining the principle of measuring a strategy correction amount.

DETAILED DESCRIPTION OF THE INVENTION

Figure 2:
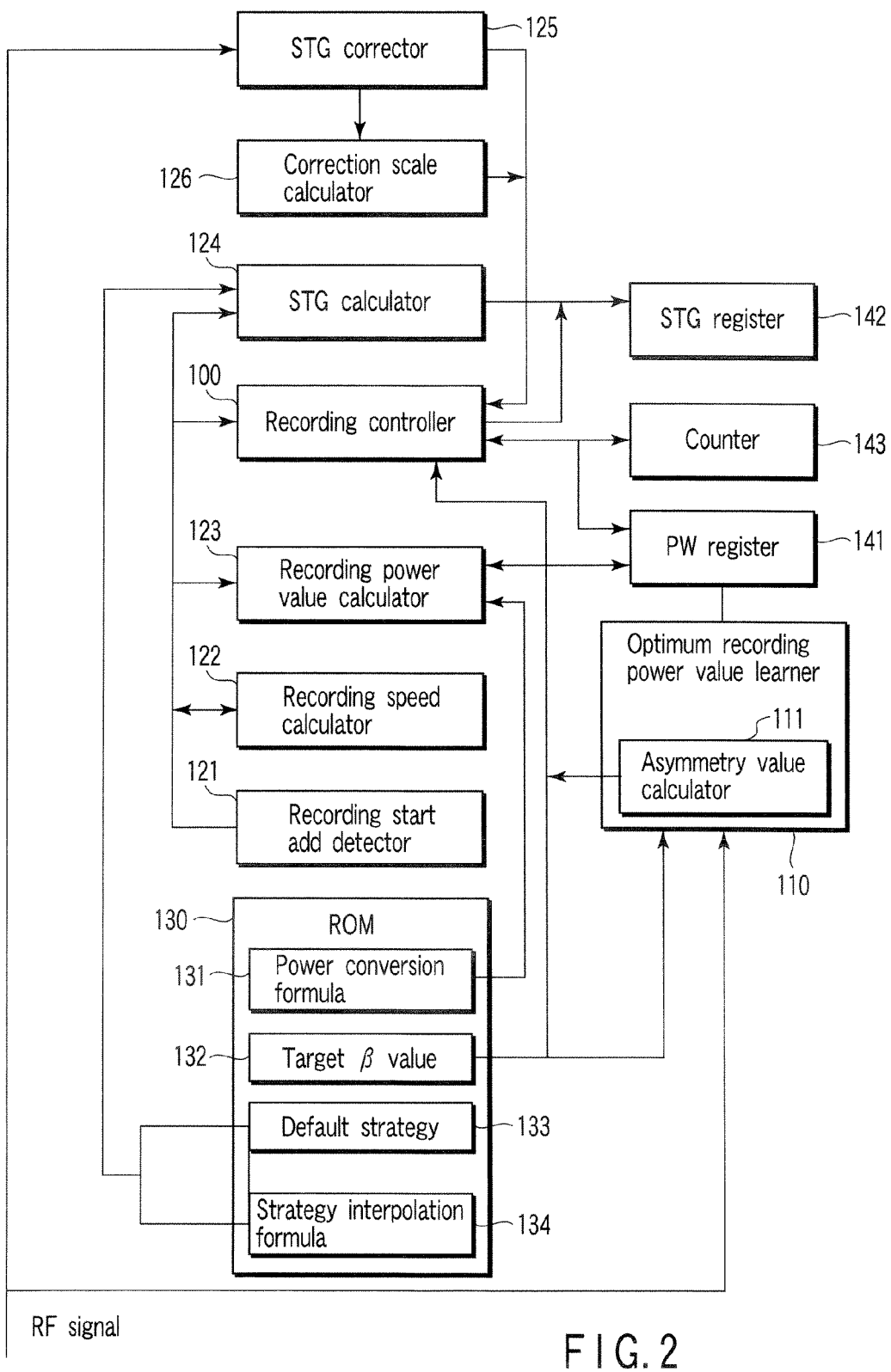
FIG. 2 is a block diagram showing a system configuration for writing information on an optical disc of the optical disc drive of FIG. 1.
Figure 4:
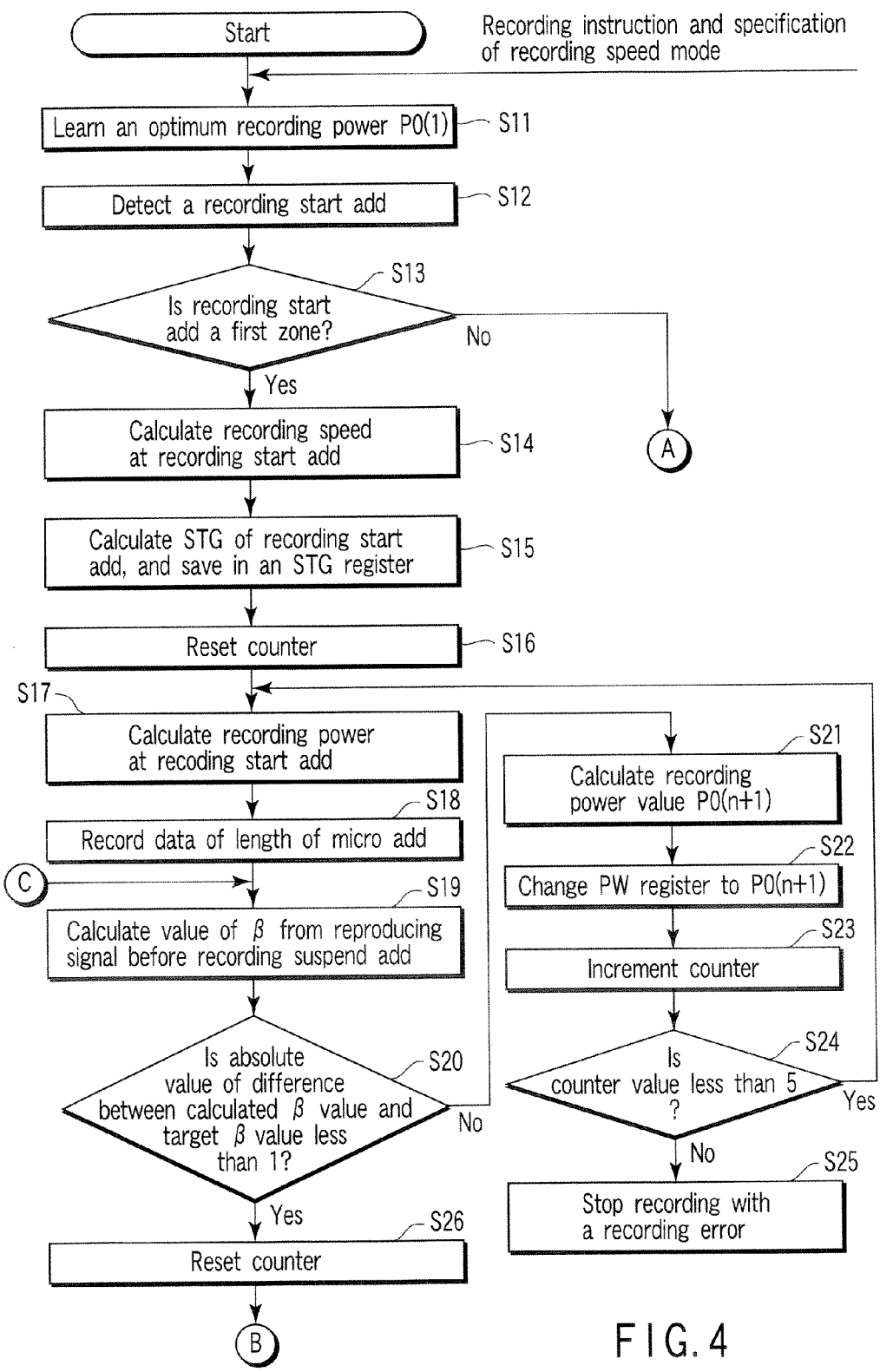
FIG. 4 is a flowchart showing a procedure of recording operation according to an embodiment of the invention.
Figure 5:
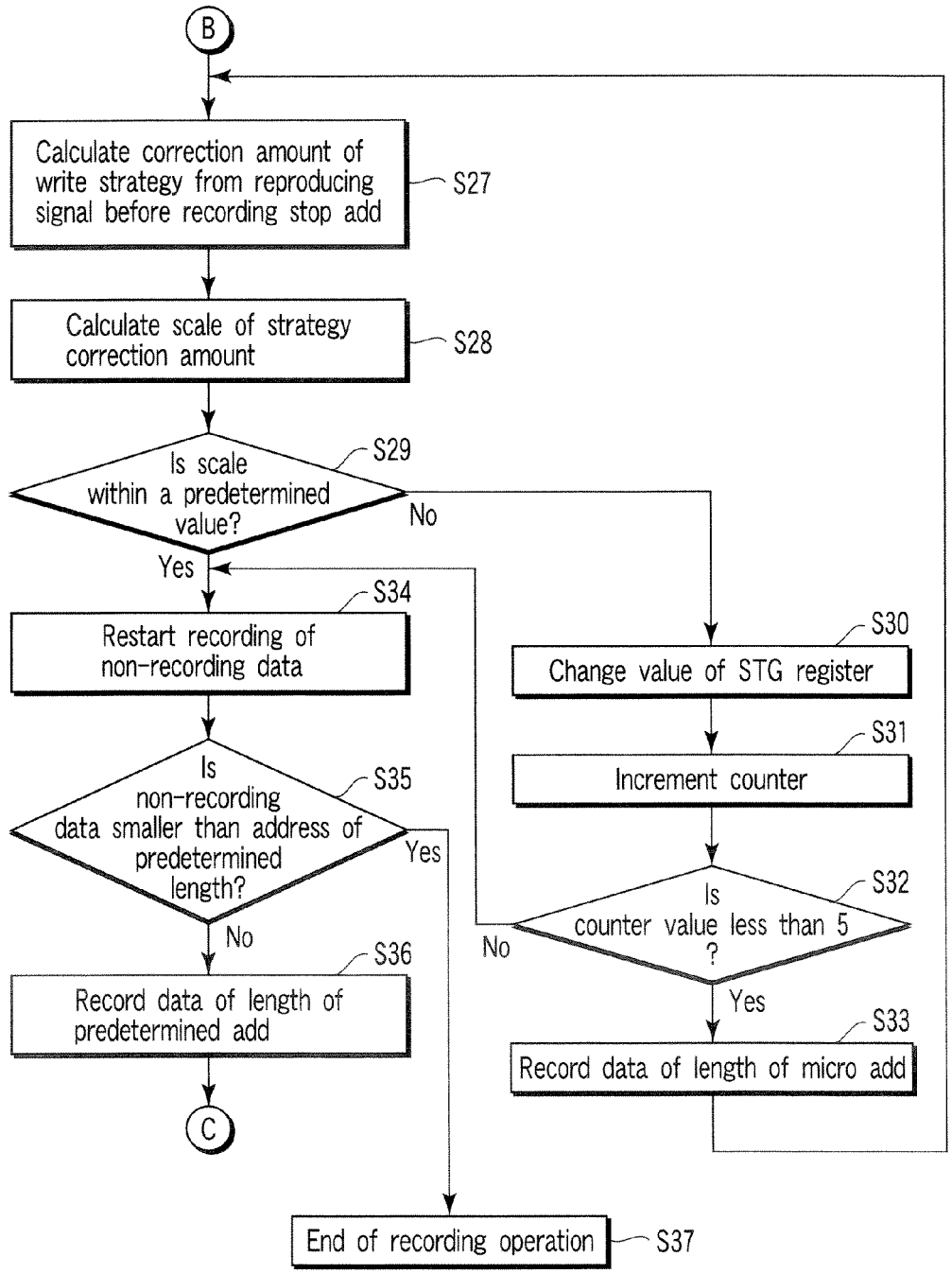
FIG. 5 is a flowchart showing a procedure of recording operation according to an embodiment of the invention.
Figure 6:
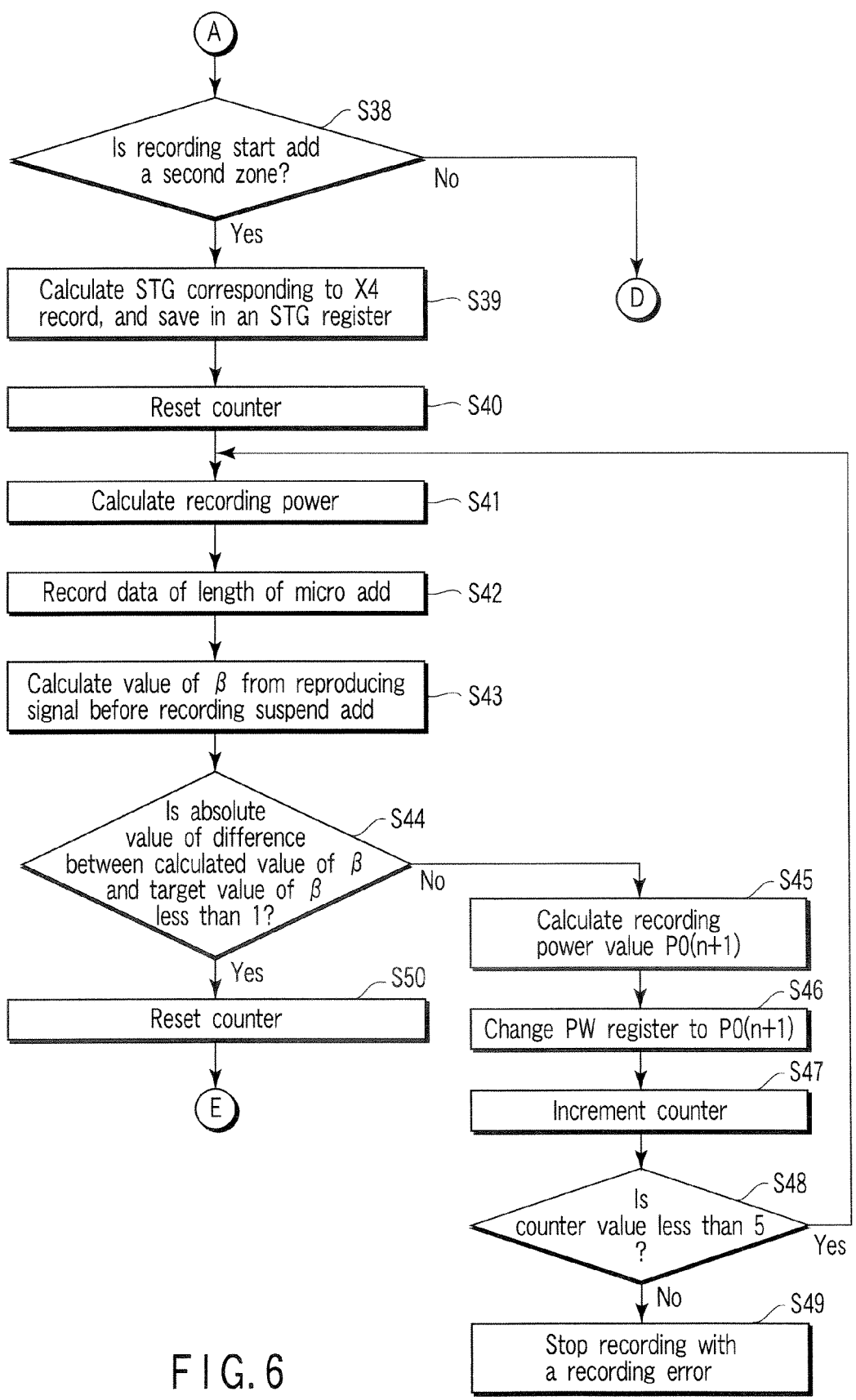
FIG. 6 is a flowchart showing a procedure of recording operation according to an embodiment of the invention.
Figure 7:
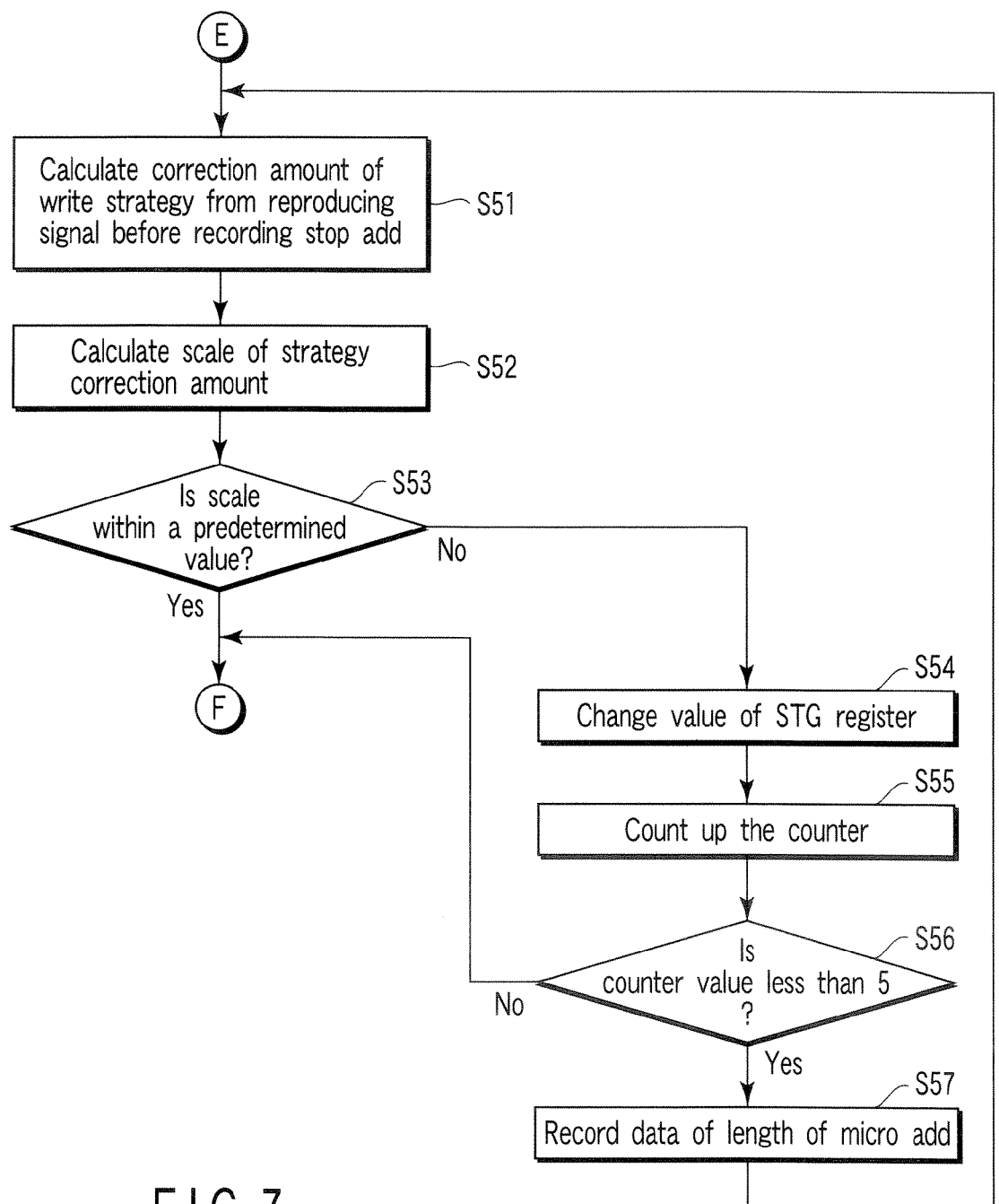
FIG. 7 is a flowchart showing a procedure of recording operation according to an embodiment of the invention.
Figure 8:
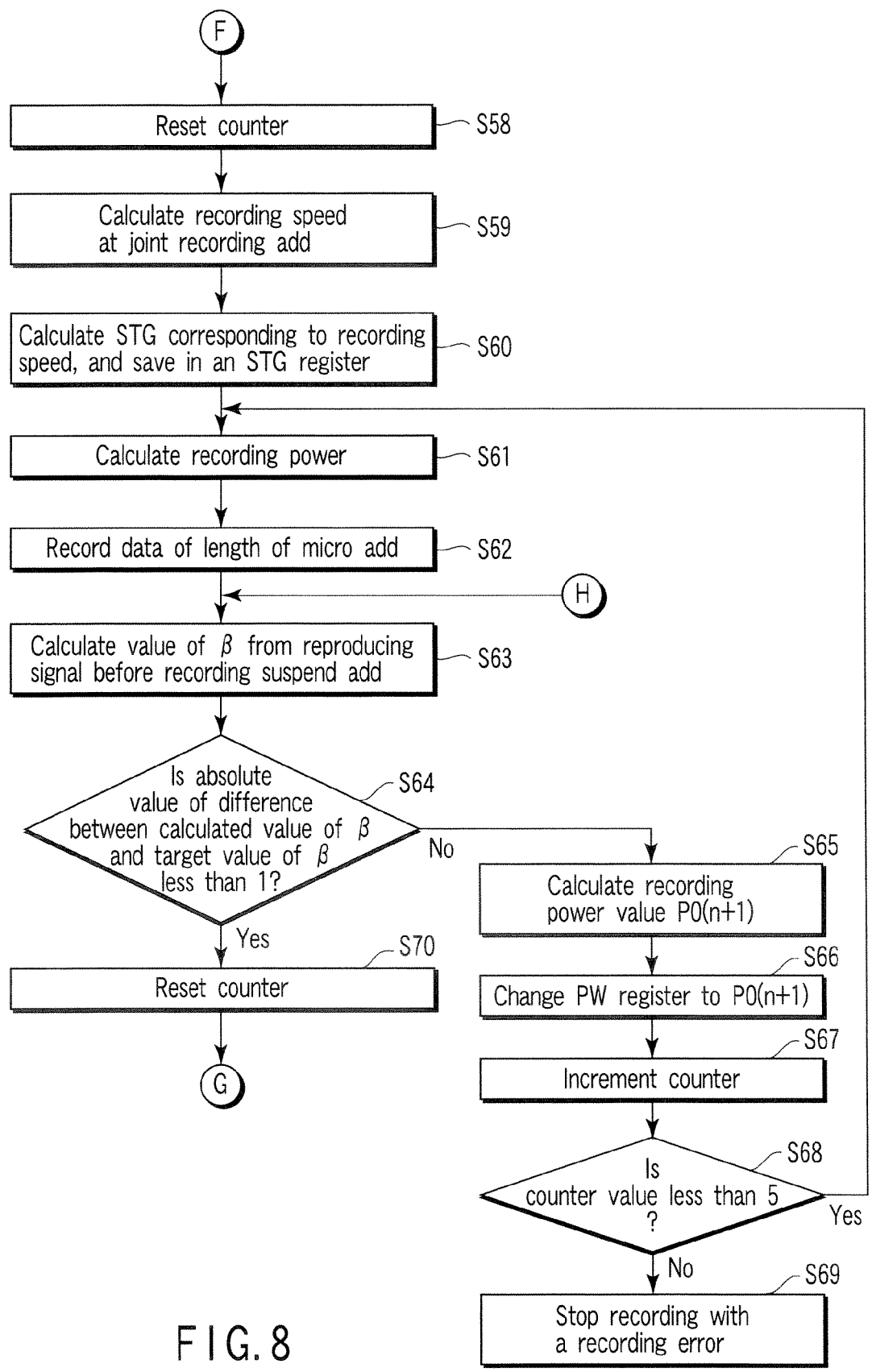
FIG. 8 is a flowchart showing a procedure of recording operation according to an embodiment of the invention.
Figure 9:
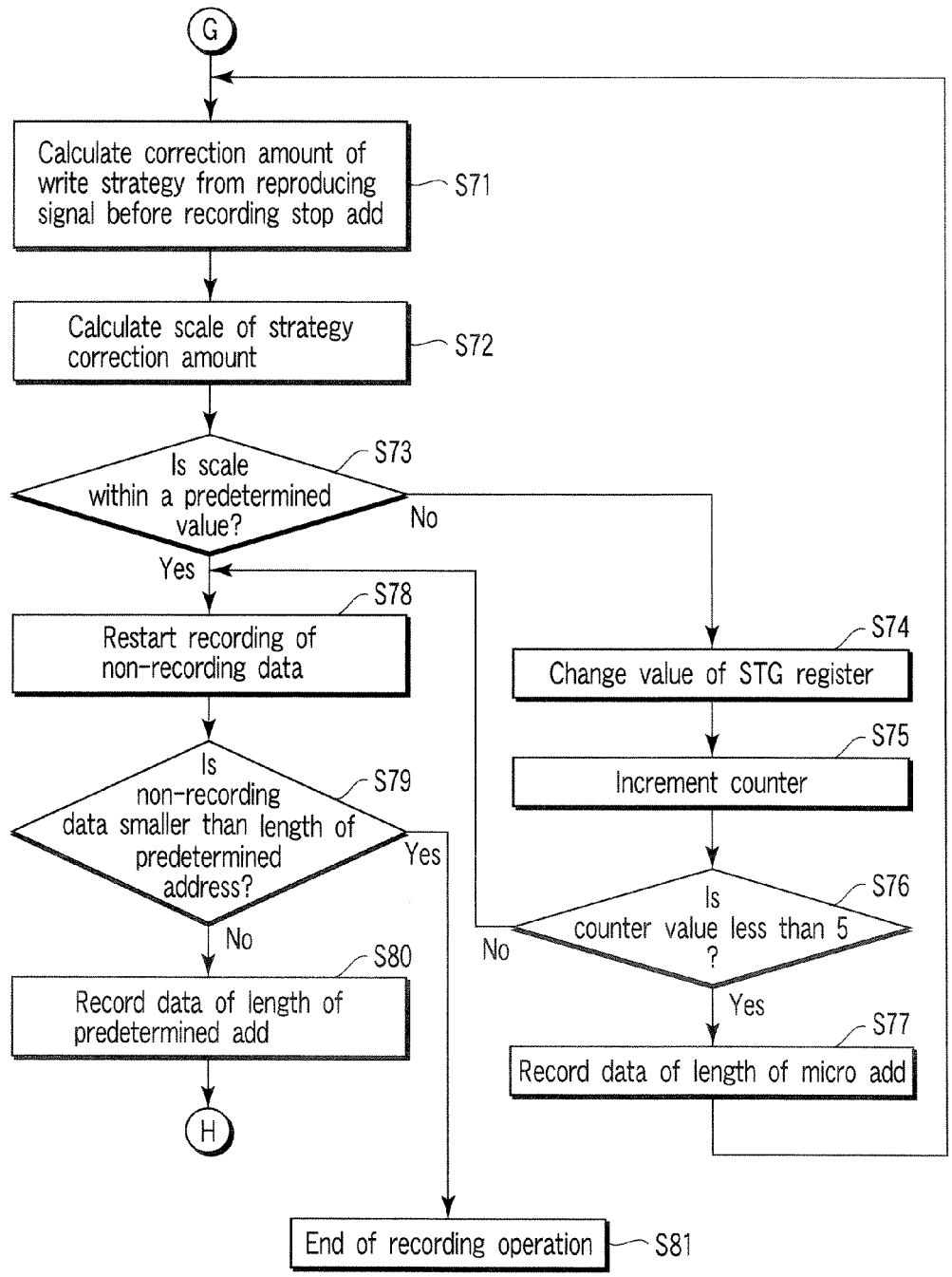
FIG. 9 is a flowchart showing a procedure of recording operation according to an embodiment of the invention.
Figure 10:
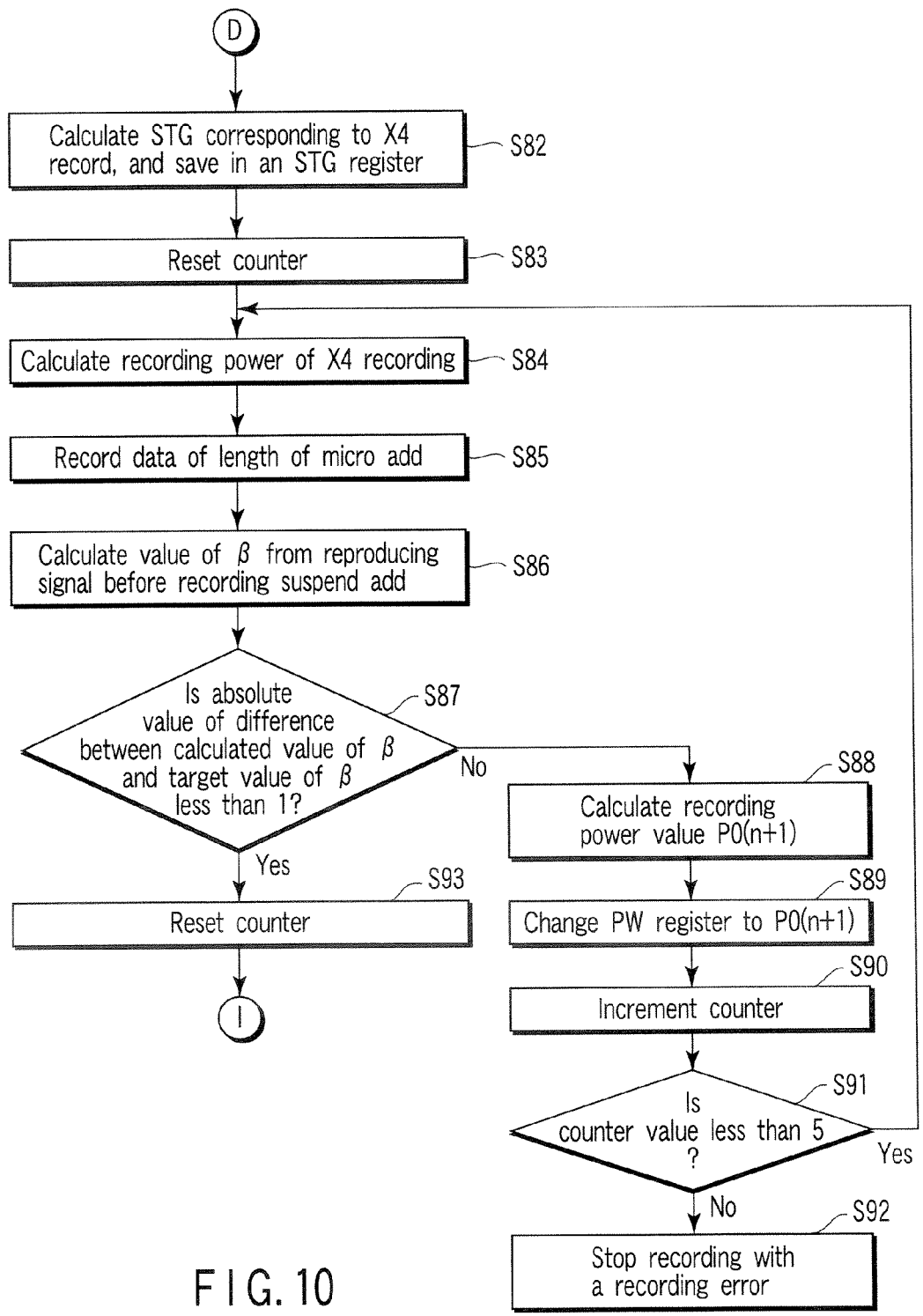
FIG. 10 is a flowchart showing a procedure of recording operation according to an embodiment of the invention.
Figure 11:
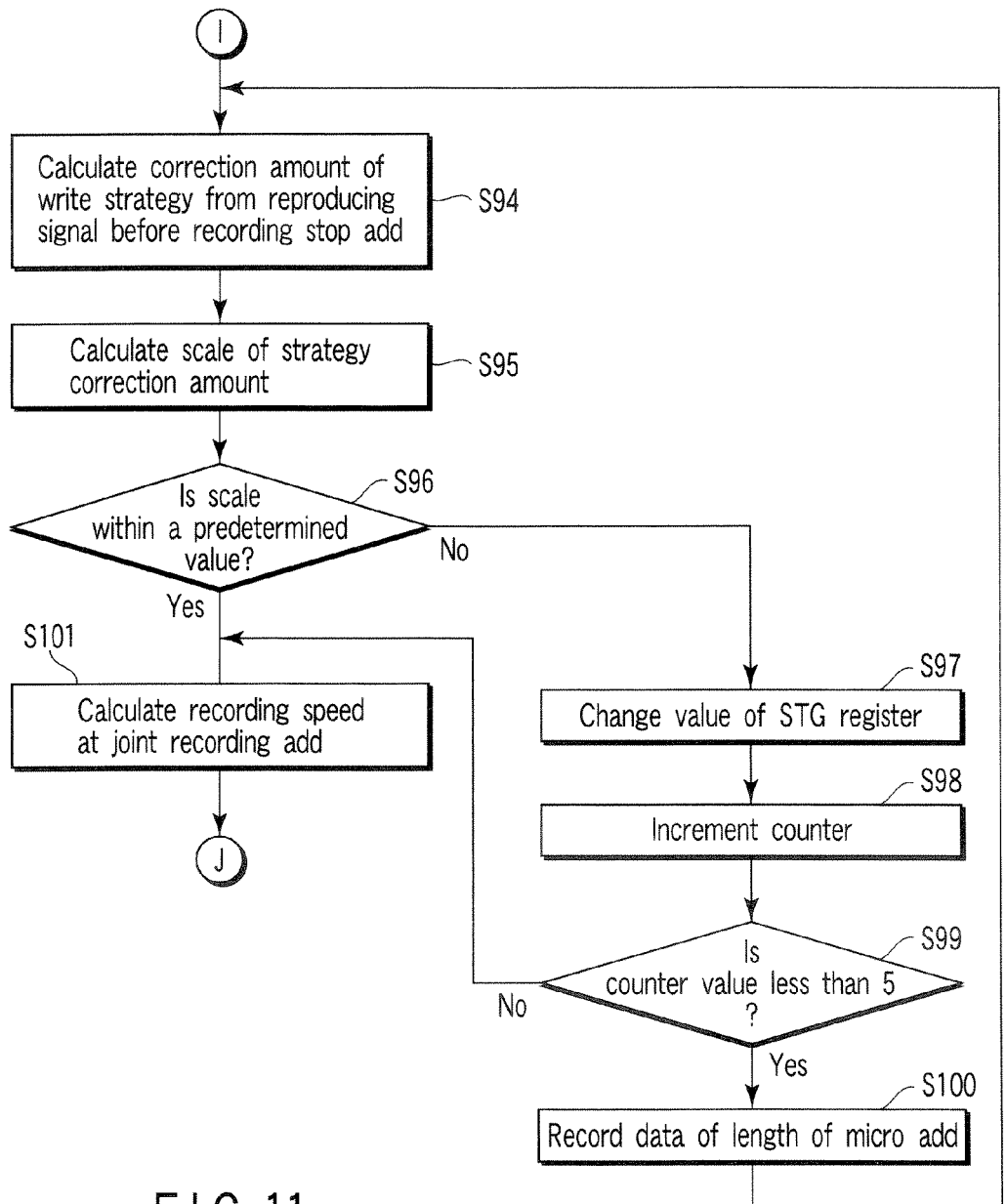
FIG. 11 is a flowchart showing a procedure of recording operation according to an embodiment of the invention.
Figure 12:
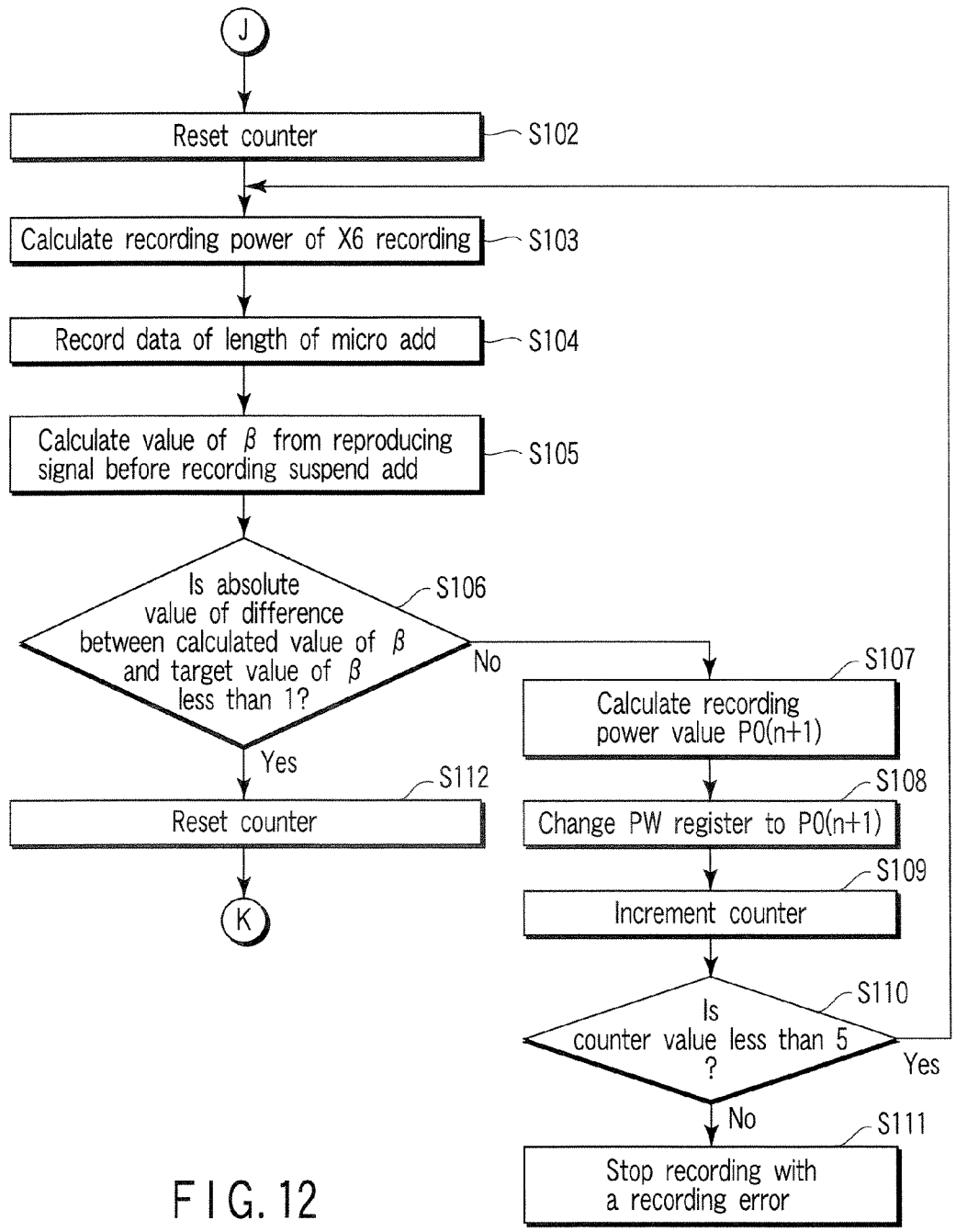
FIG. 12 is a flowchart showing a procedure of recording operation according to an embodiment of the invention.
Figure 13:
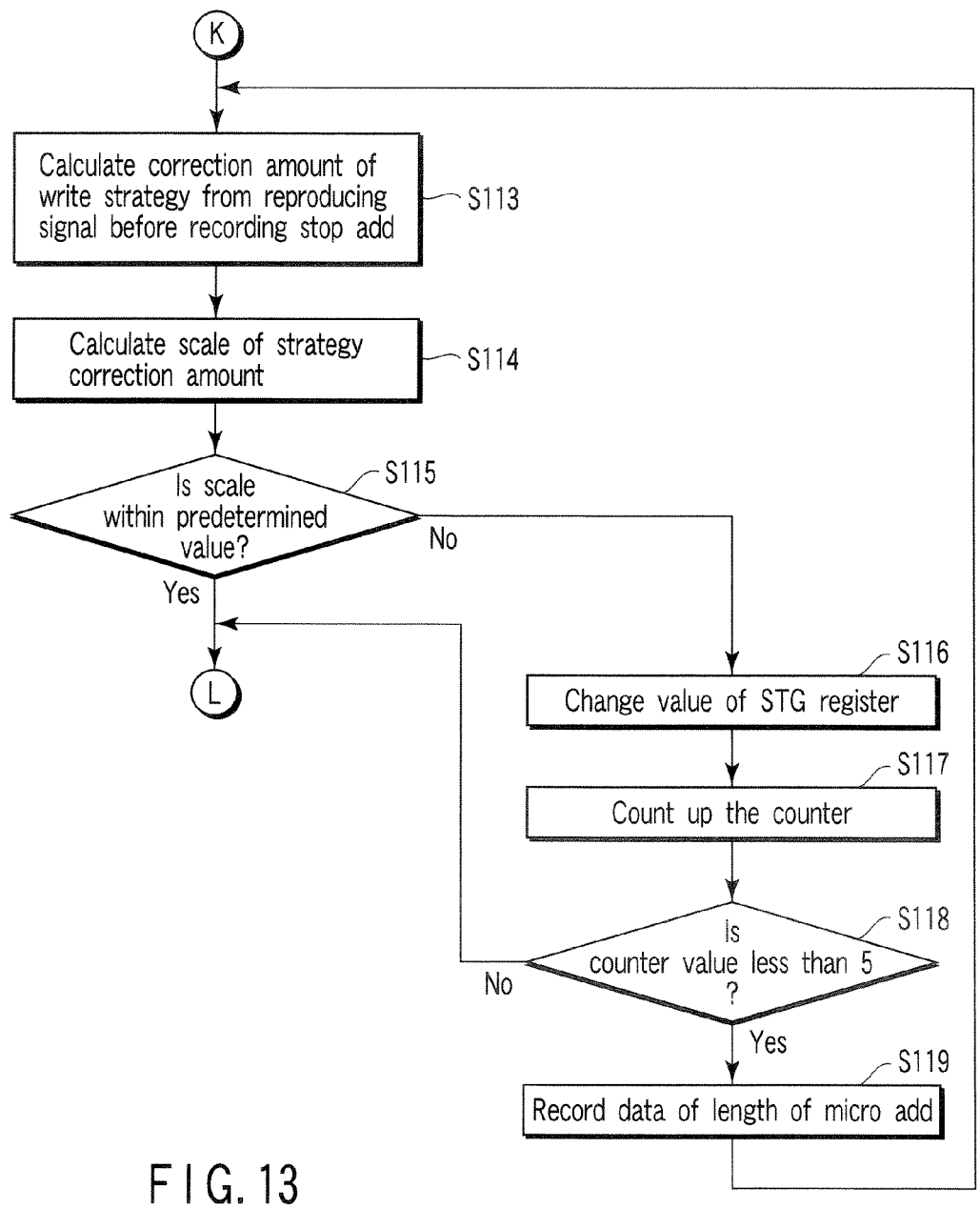
FIG. 13 is a flowchart showing a procedure of recording operation according to an embodiment of the invention.
Figure 14:
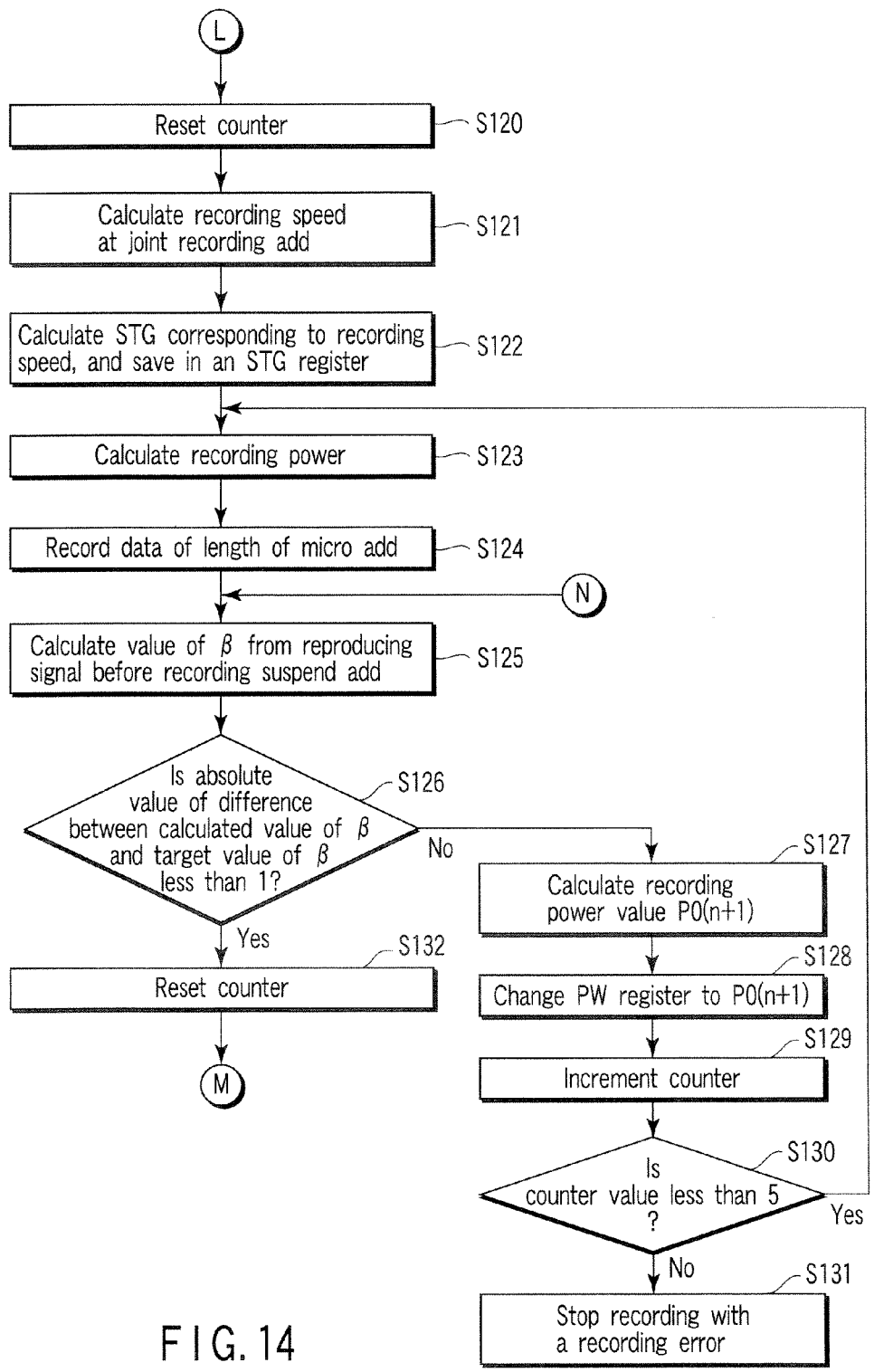
FIG. 14 is a flowchart showing a procedure of recording operation according to an embodiment of the invention.

Embodiments of the invention will be explained herein with reference to the accompanying drawings.

FIG. 1 is a block diagram showing a system configuration of an optical disc drive according to an embodiment of the invention.

In an optical disc drive 10, data D1 given sequentially from a host computer HC is sequentially stored in a buffer 12 through an interface 11, in a recording mode.

The data stored in the buffer memory 12 is sequentially supplied to an encoder 20 by units of sector (2 Kbytes). The encoder 20 comprises a parity adder 21, a modulator 22, and a write strategy unit 23. The parity adder 21 adds an error correction code and synchronizing data to the data, and supplies the data to the modulator 22. The modulator 22 performs a predetermined modulation for the data, for example, eight-to-fourteen modulation (EFM) if the data is recorded on a CD-R disc, and supplies the data to the write strategy unit 23. The write strategy unit 23 generates a recording pulse suitable for recording from the modulated recording data, and supplies the data to a laser diode 31 of an optical pickup 30.

The laser diode 31 emits an optical beam corresponding to the recording pulse. The optical beam is applied to the recording surface of an optical disc 13 through a beam splitter 32 and an object lens 33.

When the optical beam is applied to the recording surface, a reflected light from the optical disc 13 is applied to a photodetector 34 through the object lens 33 and beam splitter 32. The photodetector 34 converts an optical signal to an electric signal.

The photodetector 34 generates a servo error signal such as a tracking error signal and a focus error signal, a push-pull signal, and a RF signal, based on the reflected light from the optical disc 13. The servo error signal is supplied to the controller 37, the push-pull signal is supplied to a physical address demodulator 36, and the RF signal is supplied to a decoder 50 through an RF amplifier 35.

The servo controller 37 drives the optical disc 13 at a predetermined speed by controlling a spindle motor 42 through a spindle driver 40 based on the supplied servo error signal. The servo controller 37 moves an optical beam spot on the optical disc 13 (hereinafter called a beam spot) in the radial direction of the optical disc 13 along a data track (pre-group or land) formed on the recording surface of the optical disc 13, by controlling a thread motor 41 through a thread driver 39 based on the servo error signal. Further, the servo controller 37 controls tracking and focus by controlling an actuator through an actuator driver 38 based on the servo error signal.

The physical address demodulator 36 detects an absolute address of a beam spot at that time on the optical disc 13 by decoding a push-pull signal, and sends the address to a central processing unit (CPU) 17.

Namely, the physical address demodulator 36 extracts a wobble component contained in a push-pull signal by passing the push-pull signal through a built-in band-pass filter of a ±1 Hz range with a center frequency of 22.05 Hz, detects an absolute address of a beam spot placed at that time on the optical disc 13 by performing FM demodulation for the wobble component, and sends it to the CPU 17 as an address information signal.

Each time the absolute address on the optical disc 13 obtained by the above decoding operation is changed (i.e., each time a sector to be scanned by a beam spot on the optical disc 13 is changed), the physical address demodulator 36 sends a sink suspend signal indicating the change to the CPU 17.

Based on the address information signal and sink suspend signal given by the physical address demodulator 36, the CPU 17 sequentially recognizes a recording position of each time on the optical disk 13, and executes a necessary control for recording a record data D2 correctly on the optical disc 13 based on the result of recognition.

In a play mode, like in a record mode, by controlling the servo controller 37, the CPU 17 rotates the optical disc 13 at a predetermined speed, moves a beam spot along a data track of the optical disc 13, and controls tracking and focus.

Further, the CPU 17 emits an optical beam to the optical disc 13 by driving the laser diode 31. As a result, the optical beam reflects on the recording surface of the optical disc 13, and a read data read from the optical disc 13 obtained based on the reflected light is supplied from the photodetector 34 to the decoder 50 through the RF amplifier 35.

The decoder 50 comprises a PLL (Phase Locked Loop) circuit 51, a Sync detector 52, a demodulator 53, and an error corrector 54. The PLL circuit 51 extracts a clock CLK from the read data, and supplies the extracted clock CLK to the Sync detector 52 together with the read data.

Based on the supplied clock CLK, the Sync detector 52 generates a window pulse $P_{WIN}$ for detecting a synchronizing data with a pulse width larger than a data pattern of a synchronizing data $D_{SYNC}$ by a predetermined bit in the front and end. By using the window pulse $P_{WIN}$ for detecting a synchronizing data, the Sync detector 52 sequentially detects the synchronizing data $D_{SYNC}$ from the read data D3, and sequentially sends the read data D3 to the demodulator 53 in predetermined units based on the detection result.

The read data D3 is demodulated in the demodulator 53, and supplied to the error corrector 54. An error of the data is corrected in the error corrector 54, and the data is converted to the original format before recording, and then the data is sent to the host compute HC through the buffer memory 12 and interface 11.

As described above, the optical disc drive 10 records the data given by the host computer HC in the optical disc 13, reproduces the data recorded in the optical disc 13, and sends the data to the host computer HC.

Next, a system for writing information on the optical disc 13 will be explained with reference to a block diagram shown in FIG. 2.

An RF signal obtained by playing the optical disc 13 is supplied to an asymmetry value (or β value) calculator 111 of an optimum recording power value learner 110. The asymmetry value (or β value) calculator 111 calculates an asymmetry value or β value or γ value according to the kinds of an optical disc, and supplies the calculation result to the optimum recording power learner 110. In case of a write-once optical disc, the optimum recording power value learner 110 obtains an optimum recording power value from the supplied β value and a target β value 132 stored in a ROM (Read Only Memory) 130, for example, and saves the obtained value in a PW register 141.

A recording start address (add) detector 121 detects an address to start recording on the optical disc 13, and supplies the detection result to a recording speed calculator 122, a recording controller 100, a recording power value adder 123, and a STG calculator 124.

The recording speed calculator 122 calculates a recording speed according to a recording mode and a recording start address specified by the host computer HC, and supplies the calculation result to the recording controller 100, the recording power value calculator 123, and the STG calculator 124.

The recording power calculator 123 calculates a recording power value P(X) at a recording start address, according to a recording speed calculated by the recording speed calculator 122, a recording start address detected by the recording start address detector 121, recording power coefficient P0(0) saved in the PW register 141, and a default power conversion equation 131 stored in the ROM 130.

The default power conversion equation 131 is as follows.

$$P(X)=P0(0)\times(AX^2+BX+C)$$

Where A, B and C are constants, and X is a recording speed.
The value of P0(0), the initial value of P0, is 1, and the value of P0 after P0 is corrected by n times is P0(n).

The STG calculator 124 calculates a recording speed calculated by the recording speed calculator 122 and a strategy (STG) corresponding to a recording start address detected by the recording address detector 121, by using a default strategy 133 and a strategy interpolation formula 134 stored in the ROM 130, and saves them in a STG register 142.

The default strategy 133 is a strategy roughly adjusted beforehand (in a step of designing), and parameters corresponding to the recording speeds of 2×, 4×, 6× and 8×, for example, are stored in the ROM 130. A default strategy for a middle speed is determined by the parameters stored in the ROM 130 by calculation using the strategy interpolation formula 134 (e.g., linear interpolation).

If test recording area is provided on a disc, a strategy may be adjusted by using test recording area by the method of the aforementioned document (Jpn. Pat. Appln. KOKAI Publication No. 2004-355727), without "previously having a default strategy", and the obtained strategy may be used as a default strategy.

A STG corrector 125 calculates a correction amount of strategy from a RF reproducing signal by a predetermined method, and supplies the correction result to a correction scale calculator 126 and the recording controller 100. The correction scale calculator 126 calculates a scale of the calculated correction amount, and supplies the calculation result to the recording controller 100.

A counter 143 is incremented or reset by instructions from the recording controller 100.

In this disc drive, (an optical disc is handled by dividing into a first zone for recording at a speed of 3.3 to 4 times, a second zone for recording at a speed of 4 to 6 times, and a third zone for recording at a speed of 6 to 8 times, from inner tracks of an optical disc, as shown in FIG. 3.

Actual recording operation will now be explained with reference to FIGS. 4 to 15.

When receiving a recording instruction and a specified recording mode from the host computer HC, the optimum recording power value learner 110 performs optimum power calibration (OPC) on an optical disc by using two or more recording power values, and learns an optimum recording power value (step S11). The optimum recording power value learner 110 saves a recording power coefficient P0(1) obtained from the learned optimum recording power P(XOPC) by using the following equation in the PW register 141.

$$P0(1) = P(X_{OPC})/(AX_{OPC}^2 + BX_{OPC} + C)$$

($X_{OPC}$: Recording speed on execution of OPC)

When performing OPC for a write-once optical disc, after the optimum recording power value learner 110 performs test recording by two or more recording power values in a power calibration area (PCA) provided in an optical disc, the asymmetry value calculator 111 calculates a recording power value characteristic, for example, an asymmetry value (or β value) from a reproducing RF signal for each recording power value, and calculates a recording power value from the recording power value characteristic of an asymmetry value (or β value) to satisfy a target asymmetry value (or β value) stored in the ROM 130. When performing OPC for a rewritable optical disc, the optimum recording power value learner 110 assumes an optimum power value from a value of γ obtained from a modulation factor m and power P. During OPC, test writing is executed at a test writing speed corresponding to a specified recording speed and test by a strategy corresponding to the test writing speed.

The recording start address detector 121 detects a recording start address (add) of the optical disc 13 (step S12), and determines whether the recording start address (add) is the first zone or not (step S13). The recording start address detector 121 supplies the detection result to the recording speed calculator 122.

When the recording start position is the first zone (the innermost zone) (Yes in step S13), the recording start address (add) detector 121 informs the recording controller 100 and the recording power value calculator 123 of the recording start address and the fact that the recording start address is the first zone.

The recording speed calculator 122 calculates a recording speed at a recording start address corresponding to a specified recording mode, and supplies the calculation result to the recording power value calculator 123 and STG calculator 124 (step S14).

The STG calculator 124 calculates a strategy (STG) corresponding to the recording speed and recording start address calculated in step S14, by using the default strategy 133 and the strategy interpolation formula 134, and saves them in the STG register 142 (step S15).

The recording controller 100 resets the counter 143 to zero (step S16).

The recording power value calculator 123 calculates a recording power value at the recording start address (add) according to the recording speed calculated in step S14, the recording start address, and the recording power coefficient P0(n) saved in the PW register 141 (step S17).

The recording controller 100 records recording data of the length from a recording start address to a micro address (add) (e.g., 200H blocks) on the optical disc 13 by using the strategy saved in the STG register 142 in step S15 and the recording power value calculated in step S17, and suspends the recording operation (step S18). While the recording is suspended, rotation of the optical disc 13 is held without changing.

The recording controller 100 reproduces the data of a predetermined address (100H blocks) from a block at a predetermined number of address (e.g., 150H blocks) before the recording suspend address, and lets the asymmetry value (or β value) calculator 111 calculate a β value from the reproducing RF signal (step S19). Equivalent if an asymmetry value is used instead of a β value, but a β value is used in the following explanation.

The recording controller 100 determines whether the measured β value satisfies predetermined conditions (e.g., standards) (step S20). For example, in the operation here, the controller calculates an absolute value of the difference between the measured β value and target β value 132, and determines whether the absolute value is less than a predetermined value (e.g., 1).

When the absolute value is not less than the predetermined value (No in step S20), the recording controller 100 calculates a new recording power coefficient P0(n+1) by the following equation (step S21).

$$P0(n+1) = \{1 + \alpha(\text{target } \beta \text{ value} - \text{Measured } \beta \text{ value})\} \times P0(n)$$

Where P0(n) is the PW register 141 just before the suspension, and α is a constant (e.g., 0.01). For example, when α is 0.01 and (target β value−Measured β value)=1%, P0(n+1)= 1.01×P0(n).

The recording controller 100 changes the recording power coefficient saved in the PW register 141 to the required P0(n+1) (step S22), and increments the counter 143 by one (step S23).

The recording controller 100 determines whether the count of the counter 143 is less than a predetermined value (e.g., 5) (step S24). When the count is not less than 5 (No in step S24), the recording controller 100 stops recording as a recording error (step S25). When the count is less than 5 (Yes in step S24), the recording controller 100 executes a loop of steps S17 to S24 until the difference between the calculated β value and target β value 132 is determined to be less than 1 in step S20 or the count of the counter 143 is determined to be less than 5 in step S24.

When an absolute value of the difference between the measured β value and target β value 132 is less than 1 (Yes in step S20), the recording controller 100 resets the counter 143 (step S26).

The recording controller 100 reproduces data of the length of a predetermined number of addresses (100H blocks) from a block at a predetermined number of addresses (e.g., 150H blocks) before the recording suspend address, and the STG corrector 125 calculates a correction amount of strategy from the reproducing RF signal by a predetermined method (step S27). In step S27, correction amounts (correction amount of strategy) at the front end position and rear end position of a recording pulse of each signal (3T-11T in Digital Versatile Disc [DVD]) are calculated.

There are following methods as a method of reading the front end and rear end positions of a recording pulse, and a strategy correction method.

≪ Method of Reading the Front End and Rear End Positions of a Recording Pulse≫

The reading is possible by measuring the position that the reproducing RF signal crosses a reference line of the asymmetry value or β value with reference to a reproducing PLL clock (reproducing PLLCLK), as shown in FIG. 16. For example, measure the values of A and B by units of T/32 for each T, measure a plurality of the same T mark in order to increase accuracy, and obtain a mean value.

The reference line of the asymmetry value or β value mentioned here is a slice level of a slicing circuit for binarization of the RF signal or a zero level of A coupling.

In CD-R and DVD-R, user data is recorded by randomizing a shortest mark—longest mark and a smallest space—largest space, and a required item (the values of A and B mentioned above) can be measured with a desired accuracy by scanning a relatively small area (about 100H blocks in DVD-R).

TOSHIBA LSI, TC9453FG is provided with a function of measuring the position that the RF signal crosses a reference line of symmetry with reference to the above reproducing PLL clock. Therefore, the above measurement can be easily done by using the TC9453FG.

≪ Method of Correcting a Strategy≫

When the values of A and B of 5T mark measured by the above method are A=2T/32 and B=3T/32, hasten the pulse start position for the 5T mark before correction by 2T/32 on a time axis basis, and hasten the pulse end position for the 5T mark by 3T/32. Strategy correction is possible by making the same correction for the above 5T.

The correction scale calculator 126 calculates a scale of strategy correction amount (step S28). The correction scale calculator 126 calculates a square sum of correction amounts at the front and rear ends of each signal (3T-11T in DVD), for example.

The recording controller 100 determines whether the scale of correction amount calculated by the correction scale calculator 126 satisfies predetermined conditions (e.g., standards) (step S29). In step S29, whether the scale of correction amount is within a predetermined value is determined. If the scale of correction amount is not within a predetermined value (No in step S29), the recording controller 100 changes the set value of the STG register 142 to the correction value obtained in step S27 (step S30), and increments the counter 143 by one (step S31). The recording controller 100 determines whether the count is a predetermined value (e.g., less than 5) (step S32). When the count is less than 5 (Yes in step S32), the recording controller 100 writes recording data of the length of the micro address (e.g., 200H blocks) on the optical disc 13 by using the strategy saved in the STG register 142 and the recording power value obtained in step S17, and suspends the writing (step S33). While the writing is suspended, rotation of the optical disc 13 is held without changing. The recording controller 100 executes a loop of steps S27 to S33 until the scale is determined to be within a predetermined value in step S29, or the count of the counter 143 is determined to be not less than 5 in step S32.

When the scale of correction amount is determined to be within a predetermined value in step S29 (Yes in step S29), or the count is determined to be not less than 5 in step S32 (No in step S32), the recording controller 100 starts recording of non-recording data by using the strategy saved in the STG register 142 and the recording power value calculated in step S17 (step S34).

When the non-recording data is larger than a predetermined address length (No in step S35), the recording controller writes data of a predetermined address length on the optical disc 13, and suspends the writing (step S36).

The recording controller goes back to step S19, and executes a loop of step S19 to S34 until the non-recording data becomes smaller than a predetermined address length (Yes in step S35).

When the non-recording data becomes smaller than a predetermined address length and all non-recording data has been recorded (Yes in step S35), the recording controller 100 finishes the recording operation (step S37).

If the recording start address is not the first zone (No in step S13), the recording start address detector 121 determines whether the recording start address (add) is the second zone or not (step S38). The recording start address detector 121 supplies the detection result to the recording speed calculator 122.

If the recording start address is the second zone (Yes in step S38), the recording start address detector 121 informs the recording controller 100 and the recording power value calculator 123 of the recording start address and the fact that the recording start address is the second zone.

The STG calculator 124 calculates a strategy (STG) corresponding to a 4-time recording by using the default strategy 133 and the strategy interpolation formula 134, and saves the result in the STG register 142 (step S39).

The recording controller 100 resets the counter 143 to 0 (step S40).

The recording power value calculator 123 calculates a recording power value at the recording start address (add) from the 4-time recording speed and the recording power coefficient P0(n) saved in the PW register 141 (step S41).

The recording controller 100 records non-recording data of the length from a recording start address to a micro address (add) (e.g., 200H blocks) on the optical disc 13 by using the 4-time speed record, the strategy saved in the STG register 142 saved in step S39 and the recording power value calculated in step S41, and suspends the recording operation (step S42). While the recording is suspended, rotation of the optical disc 13 is held without changing.

Recording is not started at a maximum recordable speed $X_{MAX}$(add) at a recording start address. Because, there is a large difference between $X_{OPC}$ and $X_{MAX}$(add), and as the difference between an optimum power value and an estimated power value at $X_{MAX}$(add) calculated based on $X_{OPC}$ is increased, the recording quality is extremely reduced in some area. To prevent extreme decrease of recording quality in some area, an optimum power is optimized at a speed between $X_{OPC}$ and $X_{MAX}$ (add).

The recording controller 100 reproduces data of the length of predetermined addresses (100H blocks) from a block at a predetermined number of addresses (e.g., 150H blocks) before the recording suspend address, and lets the asymmetry value (or β value) calculator 111 calculate a β value from the reproducing RF signal (step S43).

The recording controller 100 determines whether the measured β value satisfies predetermined conditions (e.g., standards) (step S44). For example, in the operation here, the controller calculates an absolute value of the difference between the measured β value and target β value 132, and determines whether the absolute value is less than a predetermined value (e.g., 1).

When the absolute value is not less than the predetermined value (No in step S44), the recording controller 100 calculates a new recording power coefficient P0(n+1) by the following equation (step S45).

$$P0(n+1) = \{1 + \alpha(\text{target β value} - \text{Measured β value})\} \times P0(n)$$

Where P0(n) is the PW register 141 just before the suspension, and α is a constant (e.g., 0.01). For example, when α is 0.01 and (target β value−Measured β value)=1%, P0(n+1)= 1.01×P0(n).

The recording controller 100 changes the recording power coefficient saved in the PW register 141 to the required P0(n+ 1) (step S22), and increments the counter 143 by one (step S47).

The recording controller 100 determines whether the count of the counter 143 is less than a predetermined value (e.g., 5) (step S48). When the count is not less than 5 (No in step S48), the recording controller 100 stops recording as a recording error (step S49). When the count is less than 5 (Yes in step S48), the recording controller 100 executes a loop of steps S41 to S48 until the difference between the calculated β value and target β value 132 is determined to be less than 1 in step S44 or the count of the counter 143 is determined to be not less than 5 in step S48.

When an absolute value of the difference between the measured β value and target β value 132 is less than 1 in step S44 (Yes in step 44), the recording controller 100 resets the counter 143 (step S50).

The recording controller 100 reproduces data of the length of a predetermined number of addresses (100H blocks) from a block at a predetermined number of addresses (e.g., 150H blocks) before the recording suspend address, and the STG corrector 125 calculates a correction amount of strategy from the reproducing RF signal by a predetermined method (step S51). In step S51, correction amounts (correction amount of strategy) at the front end position and rear end position of a recording pulse of each signal (3T-11T in DVD) are calculated.

The correction scale calculator 126 calculates a scale of strategy correction amount (step S52). The correction scale calculator 126 calculates a square sum of correction amounts at the front and rear ends of each signal (3T-11T in DVD), for example.

The recording controller 100 determines whether the scale of correction amount calculated by the correction scale calculator 126 satisfies predetermined conditions (e.g., standards) (step S53). If the scale of correction amount is not within a predetermined value (No in step S53), the recording controller 100 changes the set value of the STG register 142 to the correction value obtained in step S51 (step S54), and increments the counter 143 by one (step S55). The recording controller 100 determines whether the count is a predetermined value (e.g., less than 5) (step S56). When the count is less than 5 (Yes in step S56), the recording controller 100 writes recording data of the length of the micro address (e.g., 200H blocks) on the optical disc 13 by using the strategy saved in the STG register 142 and the recording power value obtained in step S42, and suspends the writing (step S57). While the writing is suspended, rotation of the optical disc 13 is held without changing. The recording controller 100 executes a loop of steps S51 to S57 until the scale is determined to be within a predetermined value in step S53, or the count of the counter 143 is determined to be not less than 5 in step S56.

When the scale of correction amount is determined to be within a predetermined value in step S53 (Yes in step S53), or the count is determined to be not less than 5 in step S56 (No in step S56), the recording controller 100 resets the counter 143 to 0 (step S58).

The recording speed calculator 122 calculates a recording speed {speed faster than 4×: a recording speed differs according to a radial position (address) when a rotation speed is constant} at a joint recording start address corresponding to a specified recording mode (step S59).

The STG calculator 124 calculates a strategy based on the strategy saved in the STG register 142 and the recording speed calculated in step S59 (step S60). The strategy saved in the STG register 142 is increased in accuracy in the loop of steps S52 to S57. In step S60, a strategy is calculated based on the strategy increased in accuracy in the loop of steps S52 to S57, and the accuracy is increased.

The recording power value calculator 123 calculates a recording power value at the recording start address (add) from the recording speed calculated by the recording speed calculator 122 in step S59, and the recording power value saved in the PW register 141 (step S61).

The recording controller 100 records a part of recording data of the length from a recording start address to a micro address (add) (e.g., 200H blocks) on the optical disc 13 by using the recording speed calculated by the recording speed calculator 122 in step S59, the strategy saved in the STG register 142 in step S60, and the recording power value calculated in step S61, and suspends the recording operation (step S62). While the recording is suspended, rotation of the optical disc 13 is held without changing.

The recording controller 100 reproduces data of the length of predetermined addresses (100H blocks) from a block at a predetermined number of addresses (e.g., 150H blocks) before the recording suspend address, and lets the asymmetry value (or β value) calculator 111 calculate a β value from the reproducing RF signal (step S63).

The recording controller 100 determines whether the measured β value satisfies predetermined conditions (e.g., standards) (step S64). For example, in the operation here, the controller calculates an absolute value of the difference between the measured β value and target β value 132, and determines whether the absolute value is less than a predetermined value (e.g., 1).

When the absolute value is not less than the predetermined value (No in step S64), the recording controller 100 calculates a new recording power coefficient P0(n+1) by the following equation (step S65).

$$P0(n+1) = \{1 + \alpha(\text{target β value} - \text{Measured β value})\} \times P0(n)$$

Where P0(n) is the PW register 141 just before the suspension, and α is a constant (e.g., 0.01). For example, when α is 0.01 and (target β value−Measured β value)=1%, P0(n+1)= 1.01×P0(n).

The recording controller 100 changes the recording power coefficient saved in the PW register 141 to the required P0(n+1) (step S66), and increments the counter 143 by one (step S67).

The recording controller 100 determines whether the count of the counter 143 is less than a predetermined value (e.g., 5) (step S68). If the count is not less than 5 (No in step S68), the recording controller 100 stops recording as a recording error (step S69). If the count is less than 5 (Yes in step S68), the recording controller 100 executes a loop of steps S61 to S68 until the difference between the calculated β value and target β value 132 is determined to be less than 1 in step S64 or the count of the counter 143 is determined to be not less than 5 in step S68.

When an absolute value of the difference between the measured β value and target β value 132 is less than 1 in step S64 (Yes in S64), the recording controller 100 resets the counter 143 (step S70).

The recording controller 100 reproduces data of the length of a predetermined number of addresses (100H blocks) from a block at a predetermined number of addresses (e.g., 150H blocks) before the recording suspend address, and the STG corrector 125 calculates a correction amount of strategy from the reproducing RF signal by a predetermined method (step S71). In step S71, correction amounts (strategy correction amount) at the front end and rear end positions of a recording pulse of each signal (3T-11T in DVD) are calculated.

The correction scale calculator 126 calculates a scale of strategy correction amount (step S72). The correction scale calculator 126 calculates a square sum of the correction amount at the front end and rear end of each signal (3T-11T in DVD), for example.

The recording controller 100 determines whether the scale of correction amount calculated by the correction scale calculator 126 satisfies predetermined conditions (e.g., standards) (step S73). If the scale of correction amount is not within a predetermined value (No in step S73), the recording controller 100 changes the set value of the STG register 142 to the correction value obtained in step S71 (step S74), and increments the counter 143 by one (step S75). The recording controller 100 determines whether the count is a predetermined value (e.g., less than 5) (step S76). When the count is less than 5 (Yes in step S76), the recording controller 100 writes a part of non-recording data of the length of the micro address (e.g., 200H blocks) on the optical disc 13 by using the strategy saved in the STG register 142 and the recording power value obtained in step S61, and suspends the writing (step S77). While the writing is suspended, rotation of the optical disc 13 is held without changing. The recording controller 100 executes a loop of steps S71 to S77 until the scale is determined to be within a predetermined value in step S73, or the count of the counter 143 is determined to be not less than 5 in step S76.

When the scale of correction amount is determined to be within a predetermined value in step S73 (Yes in step S73), or the count is determined to be not less than 5 in step S76 (No in step S76), the recording controller 100 starts recording of non-recording data by using the strategy saved in the STG register 142 and the recording power value calculated in step S61 (step S78).

If the non-recording data is larger than a predetermined address length (No in step S79), the recording controller writes data of a predetermined address length on the optical disc 13, and suspends the writing (step S80).

The recording controller goes back to step S63, and executes a loop of steps S63 to S79 until the non-recording data becomes smaller than a predetermined address length (Yes in step S79).

When the non-recording data becomes smaller than a non-recording data of the length of a predetermined address and all non-recording data is recorded (Yes in step S79), the recording controller 100 finishes the recording operation (step S81).

If the recording start position is determined not the second zone (No in step S38), the recording start address detector 121 recognizes that the recording start address (add) is the third zone, and informs the recording controller 100 and the recording power value calculator of the recording start address and the fact that the recording start address is the third zone.

The STG calculator 124 calculates a strategy (STG) corresponding to a 4-time recording by using the default strategy 133 and the strategy interpolation formula 134, and saves the result in the STG register 142 (step S82).

The recording controller 100 resets the counter 143 to 0 (step S83).

The recording power value calculator 123 calculates a recording power value at the recording start address (add) from the 4-time recording speed and the recording power coefficient P0(n) saved in the PW register 141 (step S84).

The recording controller 100 records a part of recording data of the length from a recording start address to a micro address (add) (e.g., 200H blocks) on the optical disc 13 by using the 4-time speed record, the strategy saved in the STG register 142 in step S82 and the recording power value calculated in step S84, and suspends the recording operation (step S85). While the recording is suspended, rotation of the optical disc 13 is held without changing.

Recording is not started at a maximum recordable speed $X_{MAX}$ (add) at a recording start address. Because, there is a large difference between $X_{OPC}$ and $X_{MAX}$ (add), and as the difference between an optimum power value and an estimated power value at $X_{MAX}$ (add) calculated based on $X_{OPC}$ is increased, the recording quality is extremely decreased in some area. To prevent the decrease of recording quality in some area, an optimum power is optimized at a speed between $X_{OPC}$ and $X_{MAX}$ (add).

The recording controller 100 reproduces data of the length of predetermined addresses (100H blocks) from a block at a predetermined number of addresses (e.g., 150H blocks) before the recording suspend address, and lets the asymmetry value (or β value) calculator 111 calculate a β value from the reproducing RF signal (step S86).

The recording controller 100 determines whether the measured β value satisfies predetermined conditions (e.g., standards) (step S87). For example, in the operation here, the controller calculates an absolute value of the difference between the measured β value and target β value 132, and determines whether the absolute value is less than a predetermined value (e.g., 1).

When the absolute value is not less than the predetermined value (No in step S87), the recording controller 100 calculates a new recording power coefficient P0(n+1) by the following equation (step S88).

$$P0(n+1)=\{1+\alpha(\text{target }\beta\text{ value}-\text{Measured }\beta\text{ value})\}\times P0(n)$$

Where P0(n) is the PW register 141 just before the suspension, and α is a constant (e.g., 0.01). For example, when α is 0.01 and (target β value−Measured β value)=1%, P0(n+1)= 1.01×P0(n).

The recording controller 100 changes the recording power coefficient saved in the PW register 141 to the required P0(n+ 1) (step S89), and increments the counter 143 by one (step S90).

The recording controller 100 determines whether the count of the counter 143 is less than a predetermined value (e.g., 5) (step S91). When the count is not less than 5 (No in step S91), the recording controller 100 stops recording as a recording error (step S92). When the count is less than 5 (Yes in step S91), the recording controller 100 executes a loop of steps S84 to S91 until the difference between the calculated β value and target β value 132 is determined to be less than 1 in step S87 or the count of the counter 143 is determined to be not less than 5 in step S91.

When an absolute value of the difference between the measured β value and target β value 132 is less than 1 in step S87 (Yes in step 87), the recording controller 100 resets the counter 143 (step S93).

The recording controller 100 reproduces data of the length of a predetermined number of addresses (100H blocks) from a block at a predetermined number of addresses (e.g., 150H blocks) before the recording suspend address, and the STG corrector 125 calculates a correction amount of strategy from the reproducing RF signal by a predetermined method (step S94). In step S48, correction amounts (correction amount of strategy) at the front end position and rear end position of a recording pulse of each signal (3T-11T in DVD) are calculated.

The correction scale calculator 126 calculates a scale of strategy correction amount (step S95). The correction scale calculator 126 calculates a square sum of correction amounts at the front and rear ends of each signal (3T-11T in DVD), for example.

The recording controller 100 determines whether the scale of correction amount calculated by the correction scale calculator 126 satisfies predetermined conditions (e.g., standards) (step S96). When the scale of correction amount is not within a predetermined value (No in step S96), the recording controller 100 changes the set value of the STG register 142 to the correction value obtained in step S94 (step S97), and increments the counter 143 by one (step S98). The recording controller 100 determines whether the count is a predetermined value (e.g., less than 5) (step S99). When the count is less than 5 (Yes in step S99), the recording controller 100 writes a part of non-recording data of the length of the micro address (e.g., 200H blocks) on the optical disc 13 by using the strategy saved in the STG register 142 and the recording power value obtained in step S84, and suspends the writing (step S100). While the writing is suspended, rotation of the optical disc 13 is held without changing. The recording controller 100 executes a loop of steps S94 to S99 until the scale is determined to be within a predetermined value in step S96, or the count of the counter 143 is determined to be not less than 5 in step S99.

When the scale of correction amount is determined to be within a predetermined value in step S96 (Yes in step S96), or the count is determined to be not less than 5 in step S99 (No in step S99), the STG calculator 124 calculates a strategy (STG) corresponding to 6-time recording based on the strategy saved in the STG register 142 and the recording speed calculated in step S84, and saves it in the STG register 142 (step S101). The strategy saved in the STG register 142 is increased in accuracy in the loop of steps S96 to S99. In step S103, a strategy is calculated based on the strategy increased in accuracy in the loop of steps S96 to S99, and the accuracy is increased.

The recording controller 100 resets the counter 143 (step S102).

The recording power value calculator 123 calculates a recording power value at the recording start address (add) from the 6-time recording speed and the recording power coefficient P0(n) saved in the PW register 141 (step S103).

The recording controller 100 records a part of recording data of the length from a recording start address to a micro address (add) (e.g., 200H blocks) on the optical disc 13 by using the 6-time speed record, the strategy saved in the STG register 142 and the recording power value calculated in step S103, and suspends the recording operation (step S104). While the recording is suspended, rotation of the optical disc 13 is held without changing.

Recording is not started at a maximum recordable speed $X_{MAX}$(add) at a recording start address. Because, there is a large difference between 4× speed and $X_{MAX}$(add), and as the difference between an optimum power value and an estimated power value at $X_{MAX}$(add) calculated based on the optimum power value obtained at 4× is increased, the recording quality is extremely decreased in some area. To prevent the reduction of recording quality in some area, an optimum power is optimized at a speed between 4× and $X_{MAX}$(add).

The recording controller 100 reproduces data of the length of predetermined addresses (100H blocks) from a block at a predetermined number of addresses (e.g., 150H blocks) before the recording suspend address, and lets the asymmetry value (or β value) calculator 111 calculate a β value from the reproducing RF signal (step S105).

The recording controller 100 determines whether the measured β value satisfies predetermined conditions (e.g., standards) (step S106). For example, in the operation here, the controller calculates an absolute value of the difference between the measured β value and target β value 132, and determines whether the absolute value is less than a predetermined value (e.g., 1).

When the absolute value is not less than the predetermined value (No in step S106), the recording controller 100 calculates a new recording power coefficient P0(n+1) by the following equation (step S107).

$$P0(n+1)=\{1+\alpha(\text{target } \beta \text{ value}-\text{Measured } \beta \text{ value})\} \times P0(n)$$

Where P0(n) is the PW register 141 just before the suspension, and α is a constant (e.g., 0.01). For example, when α is 0.01 and (target β value−Measured β value)=1%, P0(n+1)= 1.01×P0(n).

The recording controller 100 changes the recording power coefficient saved in the PW register 141 to the required P0(n+ 1) (step S108), and increments the counter 143 by one (step S109).

The recording controller 100 determines whether the count of the counter 143 is less than a predetermined value (e.g., 5) (step S110). When the count is not less than 5 (No in step S110), the recording controller 100 stops recording as a recording error (step S111). When the count is less than 5 (Yes in step S110), the recording controller 100 executes a loop of steps S103 to S110 until the difference between the calculated β value and target β value 132 is determined to be less than 1 in step S105 or the count of the counter 143 is determined to be not less than 5 in step S110.

When an absolute value of the difference between the measured β value and target β value 132 is less than 1 in step S106 (Yes in step 106), the recording controller 100 resets the counter 143 (step S112).

The recording controller 100 reproduces data of the length of a predetermined number of addresses (100H blocks) from a block at a predetermined number of addresses (e.g., 150H blocks) before the recording suspend address, and the STG corrector 125 calculates a correction amount of strategy from the reproducing RF signal by a predetermined method (step S113). In step S113, correction amounts (correction amount of strategy) at the front end position and rear end position of a recording pulse of each signal (3T-11T in DVD) are calculated.

The correction scale calculator 126 calculates a scale of strategy correction amount (step S114). The correction scale calculator 126 calculates a square sum of correction amounts at the front and rear ends of each signal (3T-11T in DVD), for example.

The recording controller 100 determines whether the scale of correction amount calculated by the correction scale calculator 126 satisfies predetermined conditions (e.g., standards) (step S115). If the scale of correction amount is not within a predetermined value (No in step S115), the recording controller 100 changes the set value of the STG register 142 to the correction value obtained in step S113 (step S116), and increments the counter 143 by one (step S117). The recording controller 100 determines whether the count is a predetermined value (e.g., less than 5) (step S118). When the count is less than 5 (Yes in step S118), the recording controller 100 writes a part of recording data of the length of the micro address (e.g., 200H blocks) on the optical disc 13 by using the strategy saved in the STG register 142 and the recording power value obtained in step S103, and suspends the writing (step S119). While the writing is suspended, rotation of the optical disc 13 is held without changing. The recording controller 100 executes a loop of steps S113 to S119 until the scale is determined to be within a predetermined value in step S115, or the count of the counter 143 is determined to be not less than 5 in step S118.

When the scale of correction amount is determined to be within a predetermined value in step S115 (Yes in step S115), or the count is determined to be not less than 5 in step S118 (No in step S118), the recording controller 100 resets the counter 143 to 0 (step S120).

The recording speed calculator 122 calculates a recording speed {speed faster than 6×: a recording speed differs according to a radial position (address) when a rotation speed is constant} at a joint recording start address corresponding to a specified recording mode (step S121).

The STG calculator 124 calculates a strategy based on the strategy saved in the STG register 142 and the recording speed calculated in step S121, and saves the calculated strategy in the STG register 142 (step S122). The strategy saved in the STG register 142 is increased in accuracy in a loop of steps S113 to S119. In step S122, a strategy is calculated based on the strategy increased in accuracy in a loop of steps S113 to S129, and the accuracy is increased.

The recording power value calculator 123 calculates a recording power value at the recording start address (add) from the recording speed calculated by the recording speed calculator 122 in step S121, and the recording power value saved in the PW register 141 (step S123).

The recording controller 100 records a part of recording data of the length from a recording start address to a micro address (add) (e.g., 200H blocks) on the optical disc 13 by using the recording speed calculated by the recording speed calculator 122 in step S121, the strategy saved in the STG register 142 in step S122, and the recording power value calculated in step S123, and suspends the recording operation (step S124). While the recording is suspended, rotation of the optical disc 13 is held without changing.

The recording controller 100 reproduces data of the length of predetermined addresses (100H blocks) from a block at a predetermined number of addresses (e.g., 150H blocks) before the recording suspend address, and lets the asymmetry value (or β value) calculator 111 calculate a β value from the reproducing RF signal (step S125).

The recording controller 100 calculates an absolute value of the difference between the measured β value and target β value 132, and determines whether the absolute value is less than a predetermined value (e.g., 1) (step S126).

When the absolute value is not less than the predetermined value (No in step S126), the recording controller 100 calculates a new recording power coefficient P0(n+1) by the following equation (step S127).

$$P0(n+1) = \{1 + \alpha(\text{target } \beta \text{ value} - \text{Measured } \beta \text{ value})\} \times P0(n)$$

Where P0(n) is the PW register 141 just before the suspension, and α is a constant (e.g., 0.01). For example, when α is 0.01 and (target β value−Measured value)=1%, P0(n+1)=1.01×P0(n).

The recording controller 100 changes the recording power coefficient saved in the PW register 141 to the required P0(n+1) (step S128), and increments the counter 143 by one (step S129).

The recording controller 100 determines whether the count of the counter 143 is less than a predetermined value (e.g., 5) (step S130). When the count is not less than 5 (No in step S130), the recording controller 100 stops recording as a recording error (step S131). When the count is less than 5 (Yes in step S130), the recording controller 100 executes a loop of steps S123 to S130 until the difference between the calculated β value and target β value 132 is determined to be less than 1 in step S126 or the count of the counter 143 is determined to be not less than 5 in step S130.

When an absolute value of the difference between the measured β value and target β value 132 is less than 1 in step S126 (Yes in S126), the recording controller 100 resets the counter 143 (step S132).

The recording controller 100 reproduces data of the length of a predetermined number of addresses (100H blocks) from a block at a predetermined number of addresses (e.g., 150H blocks) before the recording suspend address, and the STG corrector 125 calculates a correction amount of strategy from the reproducing RF signal by a predetermined method (step S133). In step S133, correction amounts (strategy correction amount) at the front end and rear end positions of a recording pulse of each signal (3T-11T in DVD) are calculated.

The correction scale calculator 126 calculates a scale of strategy correction amount (step S134). The correction scale calculator 126 calculates a square sum of correction amounts at the front end and rear end of each signal (3T-11T in DVD), for example.

The recording controller 100 determines whether the scale of correction amount calculated by the correction scale calculator 126 satisfies is within a predetermined value (step S135). When the scale of correction amount is not within a predetermined value (No in step S135), the recording controller 100 changes the set value of the STG register 142 to the correction value obtained in step S133 (step S136), and increments the counter 143 by one (step S137). The recording controller 100 determines whether the count is a predetermined value (e.g., less than 5) (step S138). When the count is less than 5 (Yes in step S138), the recording controller 100 writes a part of non-recording data of the length of the micro address (e.g., 200H blocks) on the optical disc 13 by using the strategy saved in the STG register 142 and the recording power value obtained in step S123, and suspends the writing (step S139). While the writing is suspended, rotation of the optical disc 13 is held without changing. The recording controller 100 executes a loop of steps S133 to S139 until the correction scale is determined to be within a predetermined value in step S135, or the count of the counter 143 is determined to be not less than 5 in step S138.

When the scale of correction amount is determined to be within a predetermined value in step S135 (Yes in step S135), or the count is determined to be not less than 5 in step S138 (No in step S138), the recording controller 100 starts recording of non-recording data by using the strategy saved in the STG register 142 and the recording power value calculated in step S123 (step S140).

When the non-recording data is larger than a non-recording data of the length of a predetermined address (No in step S141), the recording controller writes data of a predetermined address length on the optical disc 13, and suspends the writing (step S142).

The recording controller goes back to step S125, and executes a loop of step S125 to S141 until the non-recording data becomes smaller than a predetermined address length (Yes in step S141).

When the non-recording data becomes smaller than a non-recording data of the length of a predetermined address and all non-recording data have been recorded (Yes in step S141), the recording controller 100 finishes the recording operation (step S143).

As described hereinbefore, by correcting a write strategy while recording data, a write strategy can be corrected even if a recording speed is changed and a write strategy is deviated from a preferable strategy, and good recording quality can be obtained without performing test recording.

As the recording characteristics of an optical disc is changed depending on the radius, a write strategy can be corrected even if deviated from a preferable strategy during recording, and good recording quality can be obtained without performing test recording.

Further, a write strategy can be corrected even if an ambient temperature is changed during recording and a write strategy is deviated from a preferable strategy, and good recording quality can be obtained without performing without performing test recording.

The invention is not limited to the embodiments described above, and may be embodied in a practical stage by modifying the constituent components without departing from the essential characteristics. The invention may be embodied in various modes by appropriately combining the components disclosed in the above embodiments. For example, some components may be eliminated from the constituent components shown in the embodiment. Components used in different embodiments may be appropriately combined.

What is claimed is:

1. An optical disc drive comprising:
    a recording start address detector configured to detect a recording start address;
    a recording speed calculator configured to calculate a recording speed according to the recording start address detected by the recording start address detector;
    a first register configured to store a write strategy calculated by carrying out a interpolation process to a preset write strategy corresponding to the recording speed;
    a second register configured to store a recording power coefficient that is calculated based on an optimum recording power value obtained by a calibration, the calibration being executed when a recording instruction is received;
    a recording power calculator configured to calculate a recording power value at the recording start address corresponding to the recording speed calculated by the recording speed calculator and the recording power coefficient stored in the second register; and
    a recording controller configured to control a recording process for writing recording user data, and to perform writing a part of the recording user data from the recording start address to a micro address on the optical disc by using the recording speed calculated by the recording speed calculator, the write strategy stored in the first register and the recording power value calculated by the recording power calculator,
    wherein the recording controller is configured to suspend the recording process after the writing the part of the recording user data, to acquire an asymmetry value or a β value calculated by using the reproducing signal of the part of the recording user data which is recorded before the suspending, and to compare an absolute value difference between the asymmetry value or the β value and a preset target value,
    the recording controller is configured to calculate a new recording power coefficient when the absolute value is not less than a first predetermined value, to update the recording power coefficient stored in the second register using the new recording power coefficient, to adjust the recording power using the updated recording power coefficient, to write the part of the recording user data from the recording start address at which the recording process is suspended to a micro address on the optical disc using the adjusted recording power, to suspend the recording process after writing the part of the recording user data, to reproduce the part of the recording user data, and to determine whether a recalculated absolute value is less than the first predetermined value,
    the recording controller is configured to acquire a correction amount of write strategy calculated from a reproducing signal at a location recorded just before the suspending to write the recording user data when the absolute value is not less than the first predetermined value, to restart the recording process using the write strategy stored in the first register and the recording power value calculated by the recording power calculator when the acquired correction amount is within a second predetermined value.

2. The optical disc drive according to claim 1, wherein
    the recording controller is configured to store a second write strategy based on the acquired correction amount in the first register when the acquired correction amount is not within the second predetermined value, to write a second part of the recording user data from the address at which the recording process is suspended to a micro address on the optical disc using the second write strategy stored in the first register and the recording power value calculated by the recording power calculator, to suspend the recording process after writing the second part of recording user data, to acquire a correction amount of write strategy calculated from a reproducing signal at a location recorded just before the suspending of the recording process, and to judge whether the correction amount is within the second predetermined value.

3. The optical disc drive of claim 1, wherein the recording controller is configured to update the write strategy multiple times until the correction amount of write strategy satisfies a predetermined standard.

4. The optical disc drive of claim 1, wherein
the calibration is executed in a power calibration area, and
the recording process, which is controlled by the recording controller, is performed outside the power calibration area.

5. An optical disc drive comprising:
a recording start address detector configured to detect a recording start address;
a recording speed calculator configured to calculate a recording speed according to the recording start address detected by the recording start address detector;
a first register configured to store a write strategy calculated by carrying out an interpolation process to a preset write strategy corresponding to the recording speed;
a second register configured to store a recording power coefficient that is calculated based on an optimum recording power value obtained by a calibration, the calibration being executed when a recording instruction is received;
a recording power calculator configured to calculate a recording power value at the recording start address corresponding to the recording speed calculated by the recording speed calculator, and the recording power coefficient stored in the second register; and
a recording controller configured to control a recording process for writing recording user data, and to perform writing a first part of the recording user data from the recording start address to a micro address on the optical disc by using the recording speed calculated by the recording speed calculator, the strategy stored in the first register and the recording power value calculated by the recording power calculator,
wherein the recording controller is configured to suspend the recording process after the writing the first part of the recording user data, to acquire an asymmetry value or a β value calculated by using the reproducing signal of the first part of the recording user data which is recorded before the suspending, and comparing, in a first comparing, the absolute value difference between the asymmetry value or the β value and a preset target value,
the recording controller is configured to perform a first adjusting process so that the absolute value is adjusted to less than a first predetermined value when the absolute value is not less than the first predetermined value in the first comparing, the first adjusting process including calculating a new recording power coefficient, updating the recording power coefficient stored in the second register using the new recording power coefficient, adjusting the recording power using the updated recording power coefficient, writing the first part of the recording user data from the recording start address at which the recording process is suspended to a micro address on the optical disc using the adjusted recording power, suspending the recording process after writing the first part of the recording user data, and reproducing the first part of the recording user data;
the recording controller is configured to acquire a correction amount of write strategy calculated from a reproducing signal at a location recorded when it is determined that the absolute value is less than the first predetermined value in the first comparing,
the recording controller is configured to acquire, when the correction amount is within a second predetermined value, recording speed at a joint recording start address corresponding to a specified recording mode, the write strategy stored in the first register based on the recording speed, and recording power based on the recording speed at the joint recording start address, to restart the recording process for writing a second part of the recording user data from the recording start address to a micro address on the optical disc, to suspend a recording process after writing the second part of the recording user data, and to reproduce the second part of the recording user data recorded in the optical disc,
the recording controller is configured to suspend the recording process after the writing the second part of the recording user data, to acquire an asymmetry value or a β value calculated by using the reproducing signal of the second part of the recording user data which is recorded before the suspending, and to compare an absolute difference between the asymmetry value or the β value and the preset target value in a second comparing,
the recording controller is configured to perform a second adjusting process so that the absolute value is adjusted to less than the first predetermined value when the absolute value is not less than the first predetermined value in the second comparing, the second adjusting process including calculating a next new recording power coefficient, updating the recording power coefficient stored in the second register using the next new recording power coefficient to adjust the recording power using the updated recording power coefficient, writing the second part of the recording user data from the recording start address at which the recording process is suspended to a micro address on the optical disc using the adjusted recording power, suspending the recording process after the writing the second part of the recording user data, and reproducing the second part of the recording user data;
the recording controller is configured to acquire, when the absolute value is less than the first predetermined value in the second comparing, a correction amount of write strategy calculated from a reproducing signal at a location recorded just before the suspending of the recording process, and to restart the recording process using by the write strategy stored in the first register and the recording power value acquired based on the recording speed at a joint recording start address when the correction amount is within the second predetermined value.

6. A recording method comprising:
detecting an address to start recording on an optical disc;
calculating a recording speed according to the recording start address;
storing a write strategy calculated by carrying out an interpolation process to a preset write strategy corresponding to the recording speed in a first register:
calculating a recording power value at the recording start address corresponding to a recording power coefficient stored in a second register and the recording speed, the recording power coefficient being calculated based on an optimum recording power value obtained by a calibration, the calibration being executed when a recording instruction is received;
performing a recording process for writing recording user data, the recording process including writing a part of the recording user data from the recording start address to a micro address on the optical disc by using the calculated recording speed, the write strategy stored in the first register, and the calculated recording power value;

suspending the recording process after the writing part of the recording user data, acquiring an asymmetry value or β value calculated by using the reproducing signal of the part of recording user data, and comparing an absolute difference between the asymmetry value or the β value and preset target value;

performing an adjusting process so that the absolute value is adjusted to less than a first predetermined value when the absolute value is not less than the first predetermined value, the adjusting process including calculating a new recording power coefficient, updating the recording power coefficient stored in the second register using the new recording power coefficient to adjust the recording power using the updated recording power coefficient, writing the part of the recording user data from the recording start address at which the recording process is suspended to a micro address on the optical disc using the adjusted recording power, suspending the recording process after the writing the part of the recording user data, and reproducing the part of the recording user data;

acquiring, when the absolute value is not less than the first predetermined value, a correction amount of write strategy calculated from a reproducing signal at a location recorded just before suspending of the recording process, and restarting, when the correction amount is within a second predetermined value, the recording process for writing a remaining of recording user data starting to record non-recording user data using the write strategy stored in the first register and the calculated recording power value.

7. The recording method according to claim 6, further comprising:

changing the write strategy stored in the first register based on the correction amount when the correction amount calculated using the reproducing signal is not within the second predetermined value;

incrementing a counting value of a counter, determining whether the counting value of the counter is less than a third predetermined value, and when the counting value of the counter is less than the third predetermined value, writing recording user data of the length of the micro address on the optical disc by using the changed write strategy stored in the first register and the recording power value calculate by the recording power calculator;

suspending the recording process after the writing the recording user data;

acquiring a correction amount of write strategy calculated from a reproducing signal at a location recorded just before the suspending of recording process; and judging whether the correction amount is within the second predetermined value.

8. A recording method comprising:

detecting an address to start recording on an optical disc;

calculating a recording speed according to the recording start address;

storing a write strategy calculated by carrying out a interpolation process to a preset write strategy corresponding to the recording speed in a first register;

calculating a recording power value at the recording start address corresponding to a recording power coefficient stored in a second register and the recording speed, the recording power coefficient being calculated based on an optimum recording power value obtained by a calibration, the calibration being executed when a recording instruction is received;

performing a recording process for writing recording user data, the recording process including writing a first part of the recording user data from the recording start address to a micro address on the optical disc by using calculated recording speed, the write strategy stored in the first register, and the calculated recording power value;

suspending the recording process after the writing the first part of the recording user data, acquiring an asymmetry value or a β value calculated by using the reproducing signal of the first part of the recording user data, and comparing, in a first comparing, an absolute value of difference between the asymmetry value or the β value and preset target value;

performing a first adjusting process so that the absolute value is less than a first predetermined value when the absolute value is not less than the first predetermined value in the first comparing, the first adjusting process including calculating a new recording power coefficient, updating the recording power coefficient stored in the second register using the new recording power coefficient, adjusting the recording power using the updated recording power coefficient, writing the first part of the recording user data from the recording start address at which the recording process is suspended to a micro address on the optical disc using the adjusted recording power, suspending the recording process after the writing the first part of the recording user data, and reproducing the first part of the recording user data;

acquiring a correction amount of write strategy calculated from a reproducing signal at a location recorded just before the suspending of the recording process when the absolute value is not less than the first predetermined value in the first comparing;

acquiring, when the correction amount is within a second predetermined value, recording speed at a joint recording start address corresponding to a specified recording mode, the write strategy stored in the first register based on the recording speed, and recording power based on the recording speed at a joint recording start address, restarting the recording process for writing a second part of the recording user data from the recording start address to a micro address on the optical disc, to suspending a recording process after writing the second part of the recording user data, and reproducing the second part of the recording user data recorded in the optical disc;

acquiring an asymmetry value or a β value calculated by using the reproducing signal of the second part of the recording user data which is recorded before the suspending, and comparing, in a second comparing, an absolute value of difference between the asymmetry value or the β value and preset target value;

performing a second adjusting process so that the absolute value is adjusted to less than the first predetermined value when the absolute value is not less than the first predetermined value in a second comparing, the second adjusting process including calculating a next new recording power coefficient, updating the recording power coefficient stored in the second register using the next new recording power coefficient, adjusting the recording power using the updated recording power coefficient, writing the second part of the recording user data from the recording start address at which the recording process is suspended to a micro address on the optical disc using the adjusted recording power, suspending the recording process after the writing the second part of the recording user data, and reproducing the second part of the recording user data;

acquiring, when the absolute value is not less than the first predetermined value in the second comparing, a correction amount of write strategy calculated from a reproducing signal at a location recorded just before the suspending of the recording process, and restarting, when the correction amount is within the second predetermined value, the recording process using by the write strategy stored in the first register and the recording power value acquired based on the recording speed at the recording start address.

* * * * *